Figure 1:
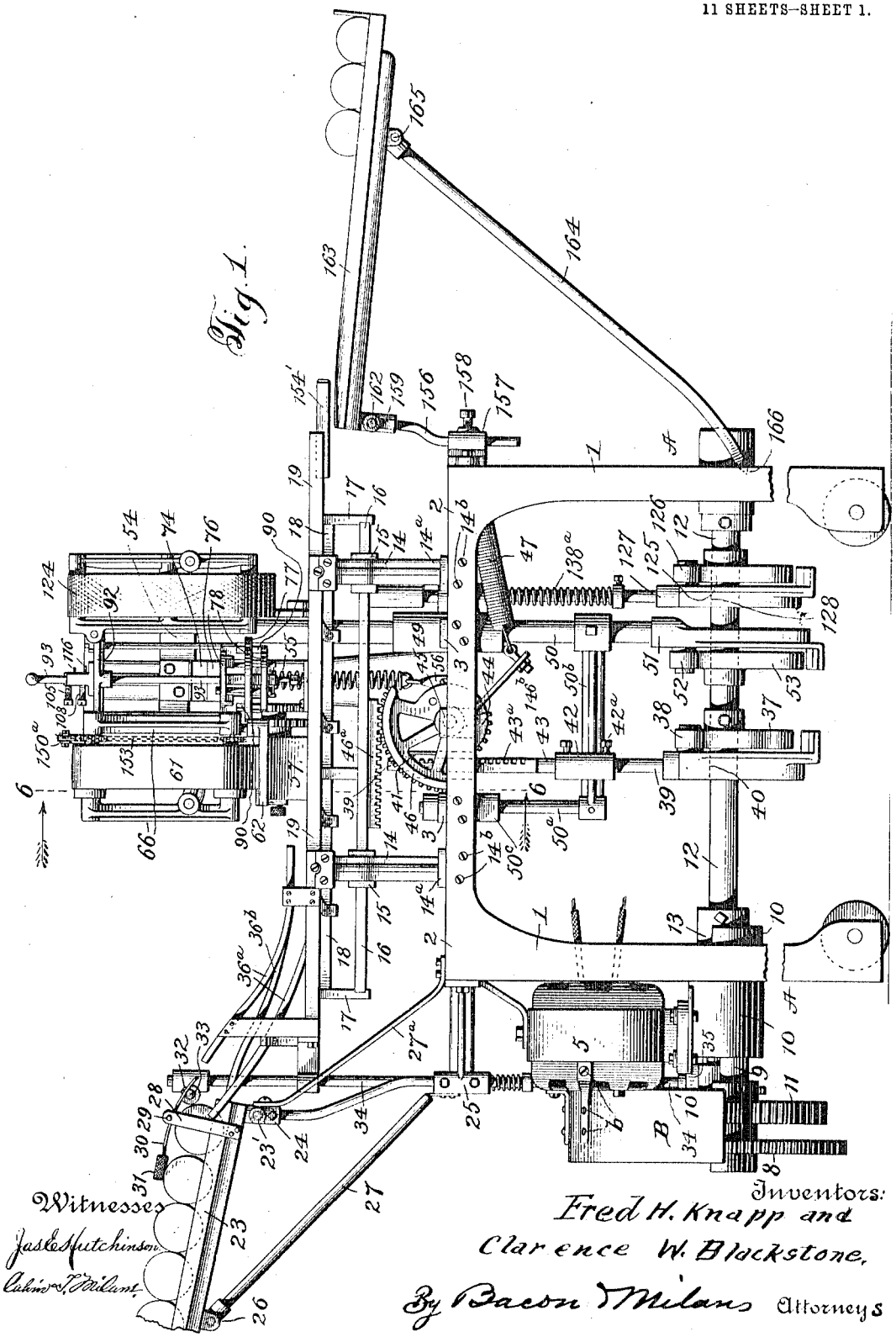

F. H. KNAPP & C. W. BLACKSTONE.
LABELING MACHINE.
APPLICATION FILED FEB. 20, 1909.

1,106,100.

Patented Aug. 4, 1914.
11 SHEETS—SHEET 1.

Witnesses
Jas E Hutchinson
Calvin T Milans

Inventors:
Fred H. Knapp and
Clarence W. Blackstone,
By Bacon Milans Attorneys

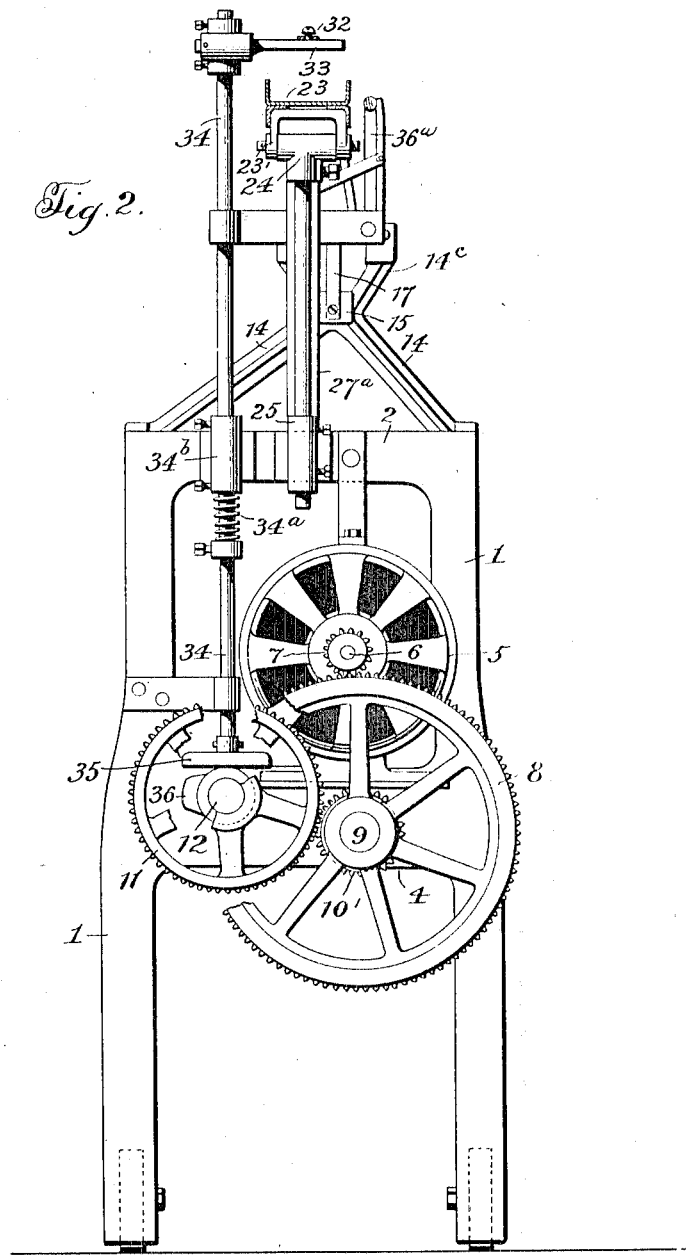

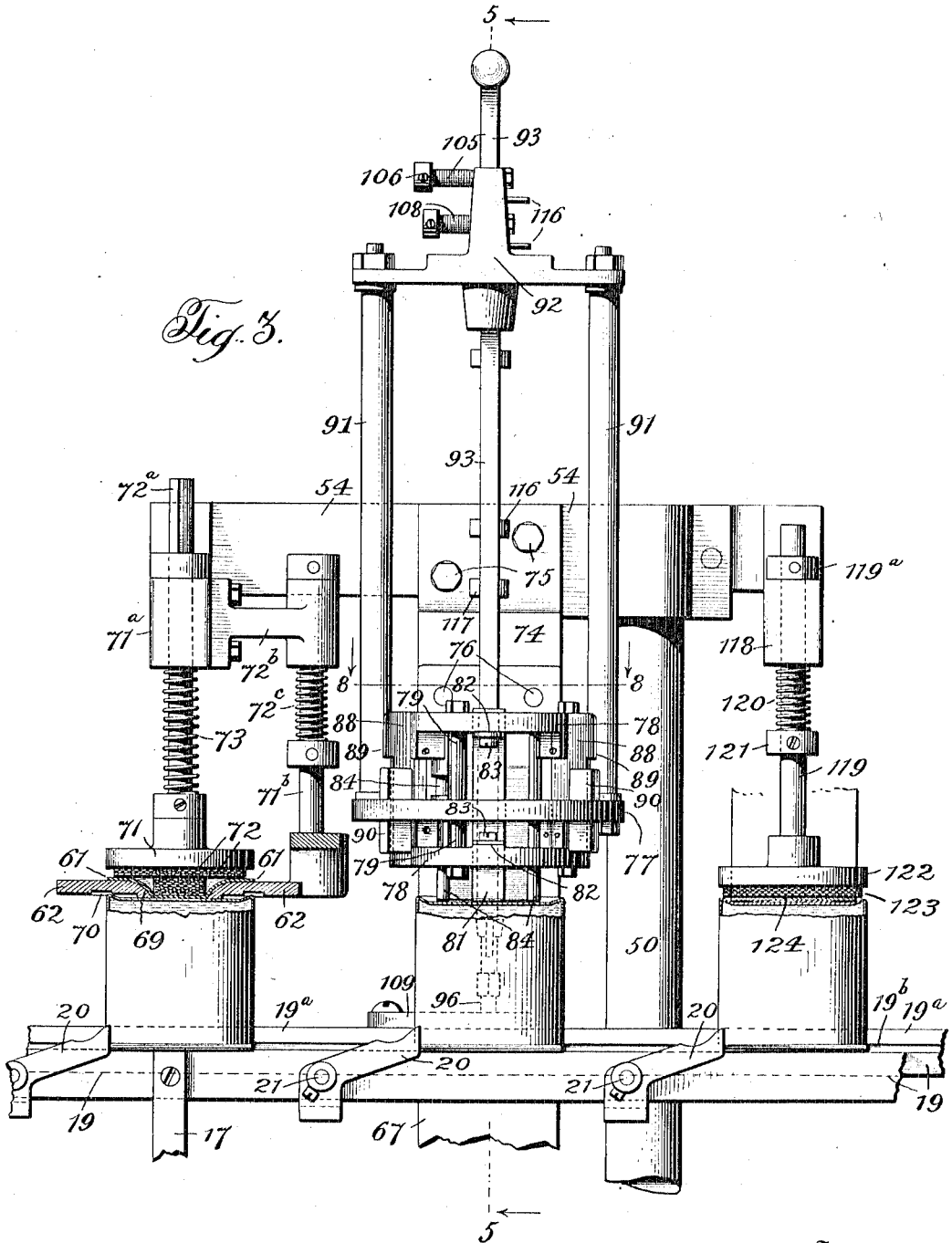

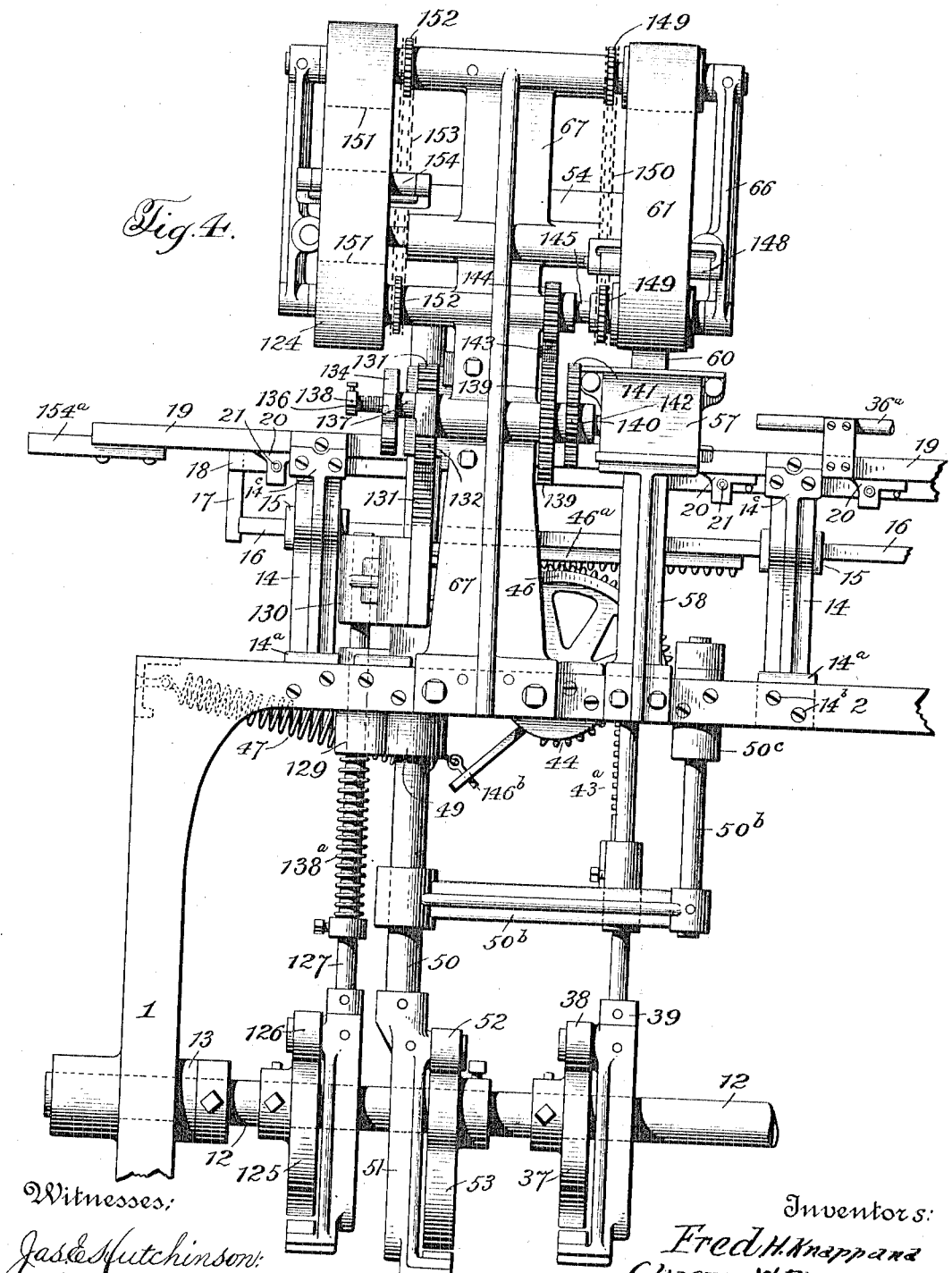

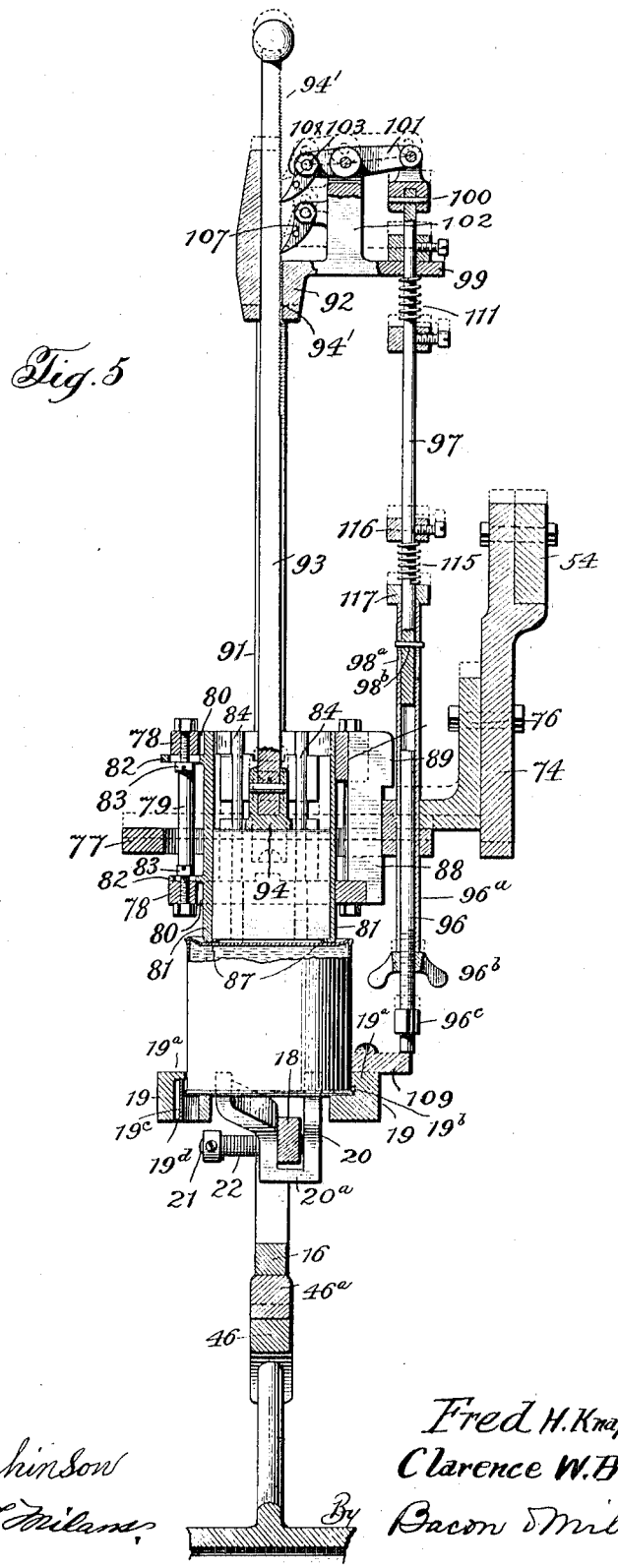

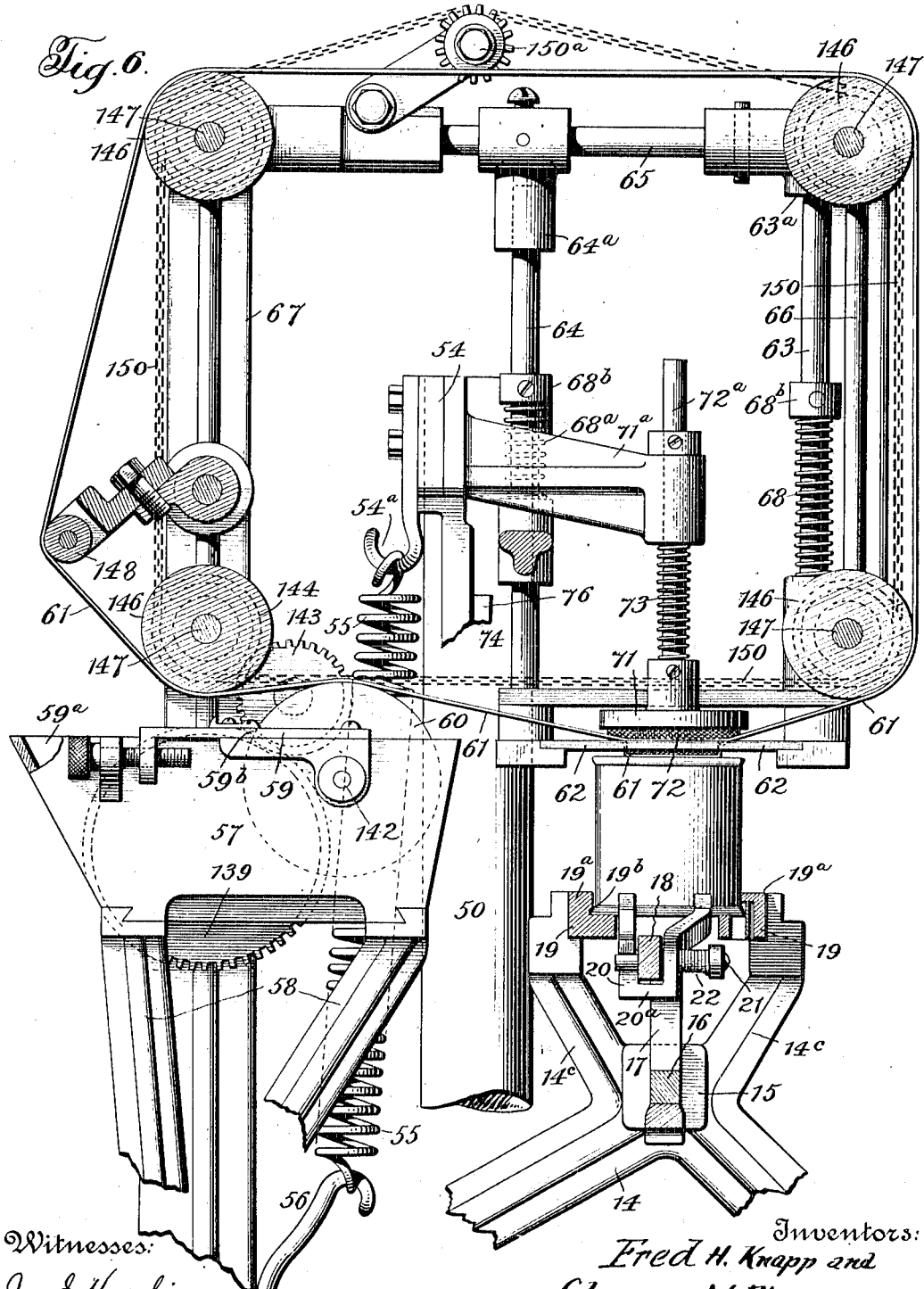

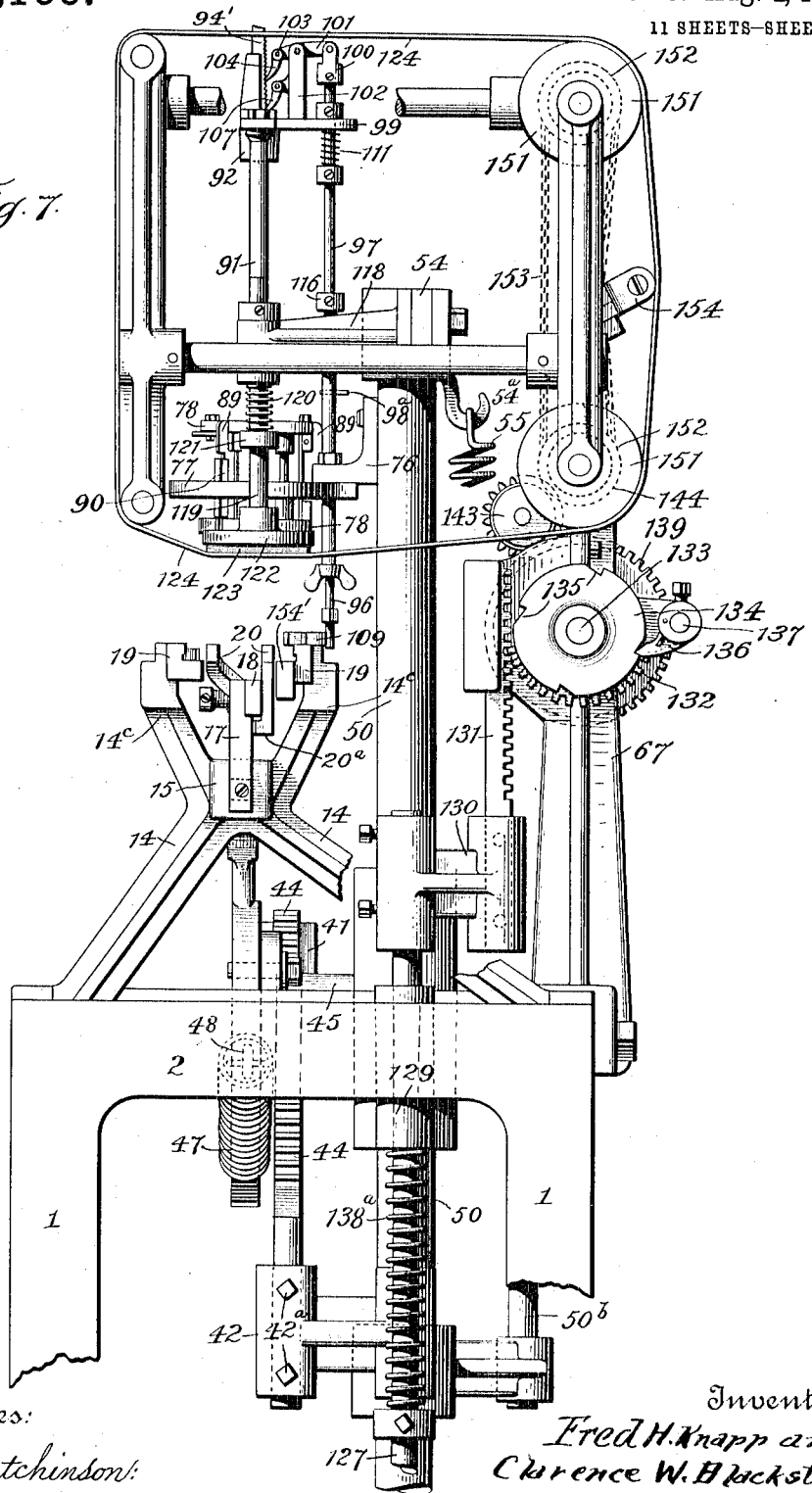

F. H. KNAPP & C. W. BLACKSTONE.
LABELING MACHINE.
APPLICATION FILED FEB. 20, 1909.
1,106,100.
Patented Aug. 4, 1914.
11 SHEETS—SHEET 8.
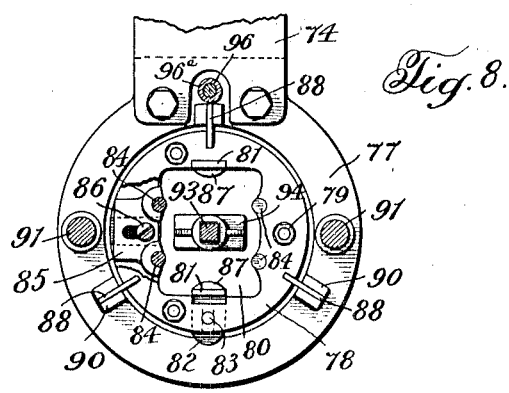
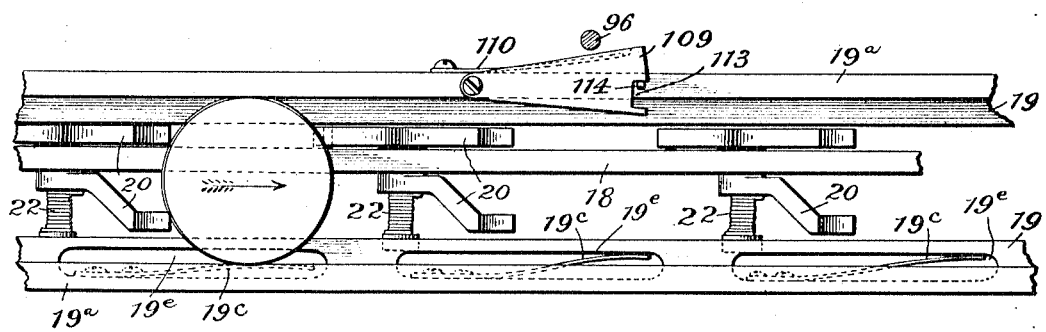
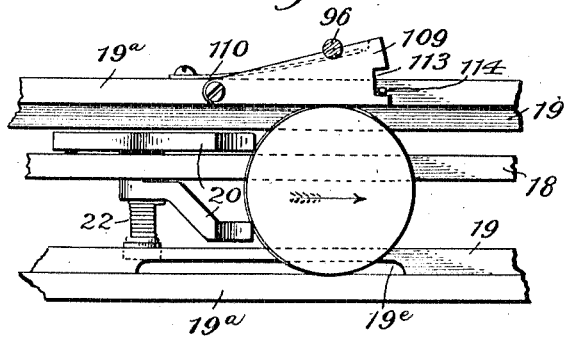
Witnesses:
Inventors:
Fred H. Knapp and
Clarence W. Blackstone,
By Bacon Milans Attorneys:

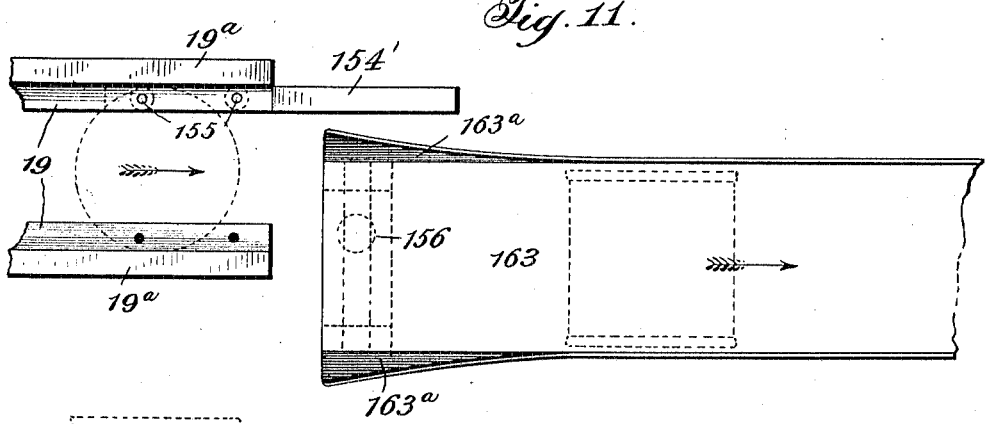
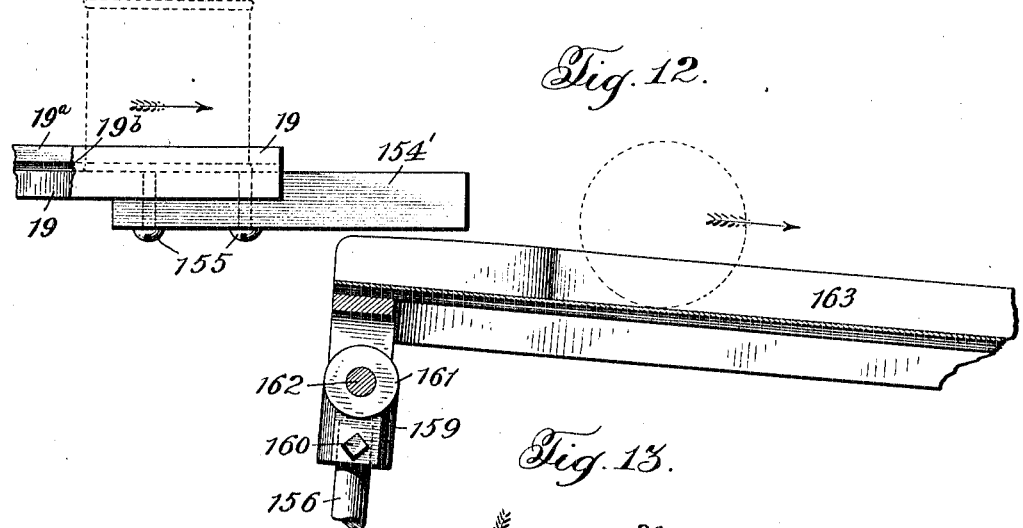
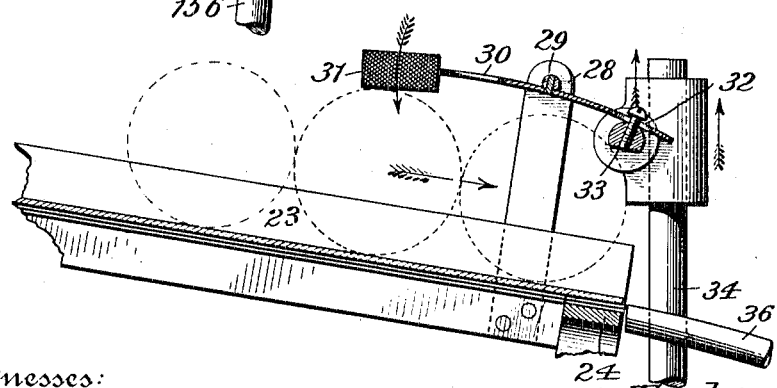

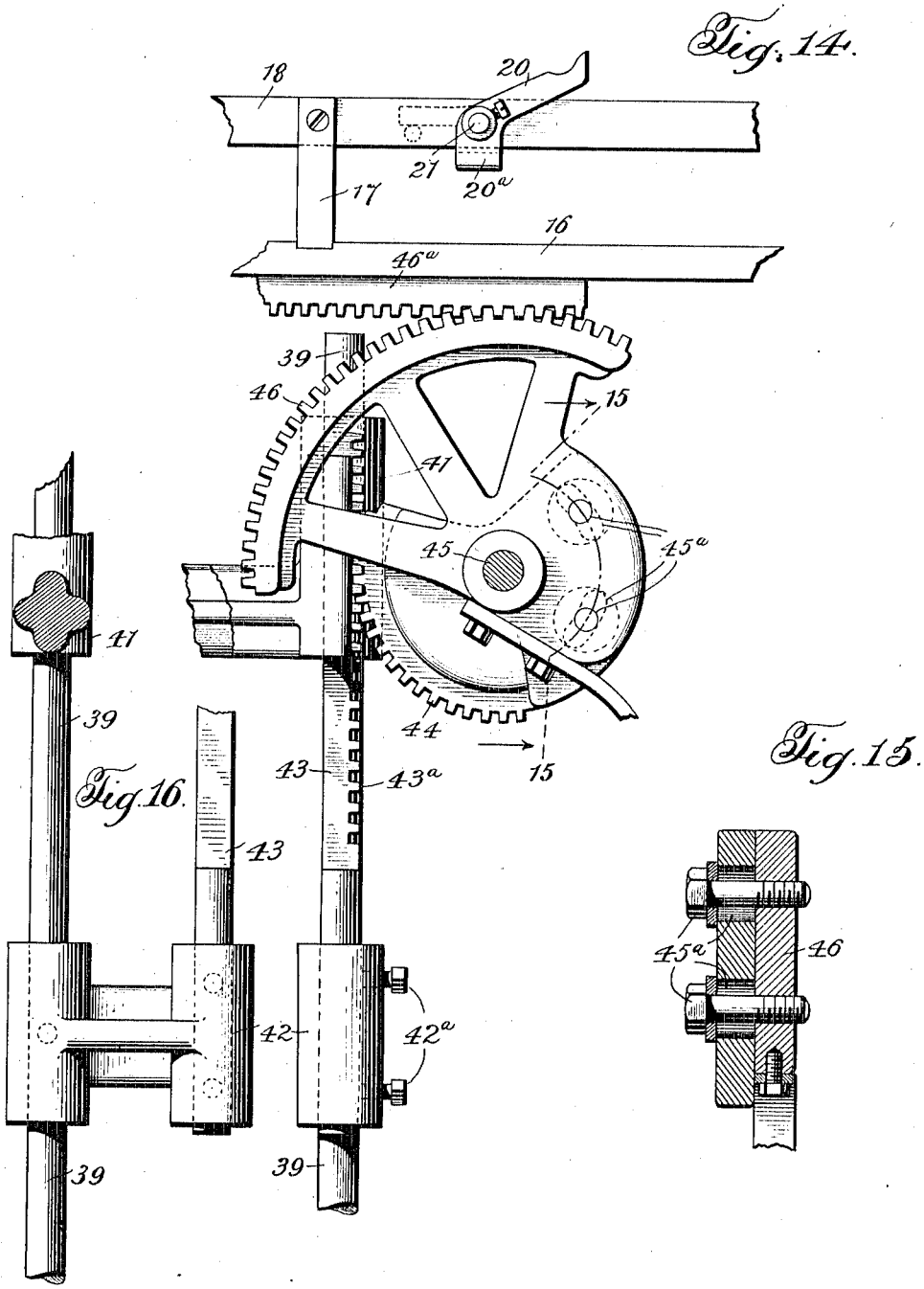

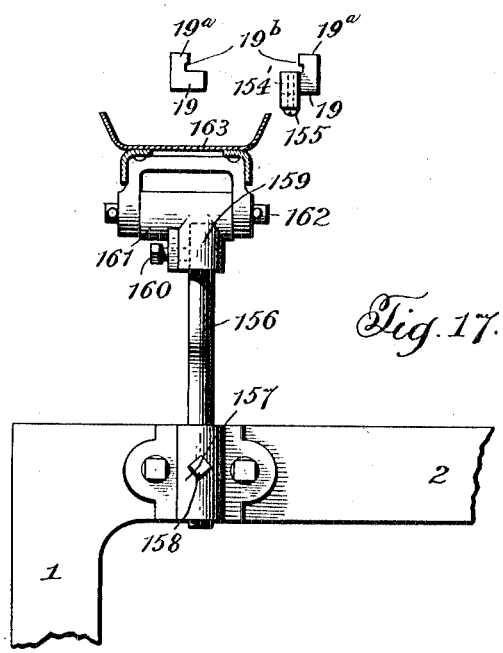
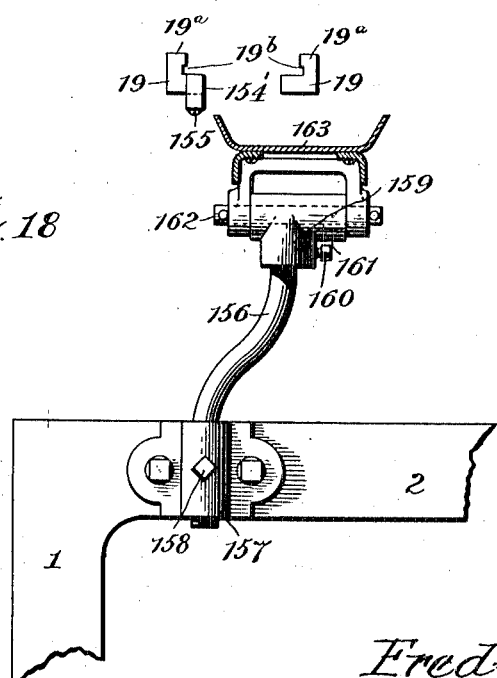

UNITED STATES PATENT OFFICE.

FRED H. KNAPP, OF WESTMINSTER, MARYLAND, AND CLARENCE W. BLACKSTONE, OF CHICAGO, ILLINOIS, ASSIGNORS TO FRED H. KNAPP COMPANY, OF WESTMINSTER, MARYLAND, A CORPORATION OF MARYLAND.

LABELING-MACHINE.

1,106,100. Specification of Letters Patent. Patented Aug. 4, 1914.

Application filed February 20, 1909. Serial No. 479,292.

*To all whom it may concern:*

Be it known that we, FRED H. KNAPP and CLARENCE W. BLACKSTONE, citizens of the United States, residing at Westminster, county of Carroll, and State of Maryland, and Chicago, in the county of Cook and State of Illinois, respectively, have invented certain new and useful Improvements in Labeling-Machines, of which the following is a specification, reference being had therein to the accompanying drawing.

This invention relates to labeling machines and particularly to that type of machine adapted to apply labels to the heads or ends of cans or other packages or receptacles.

It is the primary object of the invention to provide a machine for the above purpose, which is particularly efficient and durable in operation.

To the above end, the invention includes an entrance run-way or feed for the cans to be labeled with associated novel means for timing the entrance of the cans from the run-way to the main feed whereby but one only of the cans will be delivered to the feed at a time.

The invention also includes improved pasting instrumentalities, label positioning or applying mechanism, and label pressing or affixing apparatus designed to operate successively on the cans as they travel from one operative position to the other.

Novel feeding mechanism is also employed to carry the cans from one operative position to the other and so through the machine; also means whereby the cans are firmly supported at the end opposite to that to which the label is being applied, with means for preventing tilting or upsetting of the cans either during their feed or at their points of rest.

Further, the invention includes novel and improved delivery mechanism for the labeled cans, especially adapting the mechanism for use in connection with any of the accepted types of body labeling machines, which may be coupled directly to the delivery end of the present machine, though the body label affixing mechanism constitutes no part of the present invention.

In carrying out the principles of operation of the present machine, the preferred construction comprises means for righting the cans which, as is usual, roll bodily along the entrance runway; or presenting the cans end up to the feeding mechanism, with means for holding the cans upright on the feed, together with a common head having reciprocatory movement above the exposed heads of the cans and carrying the several mechanisms including the paster, label positioner, and affixer, for simultaneous movement, whereby as one label is being affixed by the affixer or pusher, the succeeding can is having a label positioned or applied to its pasted end, while at the same time still another can, the one next adjacent the label positioner, is being operated upon by the pasting mechanism.

Another important feature of the invention resides in the improved means for insuring the delivery of but a single label to each pasted can, and means for operating the label follower in correspondence to the delivery of the labels.

While the above are some of the main or important features of the invention, many others will be pointed out hereinafter in a detailed description of the parts and for a clear understanding of such description, reference is directed to the accompanying drawings, which form a part hereof, and wherein a satisfactory embodiment of the invention is disclosed for the purpose of illustration, though it is to be understood that many minor changes may be made in carrying out the principle of operation.

With reference to the drawings, Figure 1 is a front elevation of the machine, Fig. 2 is an elevation of the feeding or front end of the machine with parts in section, Fig. 3 is a front elevation of a portion of the machine enlarged, showing the pasting, positioning or applying, and pushing or affixing apparatus in operative position, and the runway in section, Fig. 4 is a rear elevation on an enlarged scale of the main portion of the machine, Fig. 5 is a vertical longitudinal section on line 5—5 of Fig. 3, Fig. 6 is an enlarged sectional view on line 6—6 of Fig. 1 looking in the direction of the arrows, showing labeling and pressing mechanism removed. Fig. 7 is an enlarged elevation of the delivery end of the machine, with parts broken away, Fig. 8 is a section on the line 8—8 of Fig. 3 looking in the direction of the arrows. Figs. 9 and 10 are enlarged plan views of a portion of the feed and can support, with the label positioner and applier controller in reverse positions. Figs. 11 and 12 are enlarged detail views illustrative of the delivery end of the machine, Fig. 13 is an enlarged detail view of the can spacing or escapement mechanism, Fig. 14 is a front elevation of a portion of the feed enlarged with the operating mechanism therefor, Fig. 15 is a section on the line 15—15 of Fig. 14 looking in the direction of the arrows. Fig. 16 is a detail view of a portion of the operating mechanism for the feed, and Figs. 17 and 18 are enlarged detail views of the supporting mechanism for the delivery runway.

Referring more particularly to the drawings, wherein like reference characters represent corresponding parts throughout the various views, A is a suitable frame of any convenient construction, but preferably comprising upright legs or standards 1, positioned at the ends of a rectangular frame 2, which latter has suitable cross braces or bars 3, intermediate its ends. The legs at the respective ends of the frame are suitably braced intermediate their ends by connecting bars 4.

5 is a motor suitably mounted at the forward end of the machine, conveniently an electric motor, and has a shaft 6 projecting forwardly therefrom, with a cog wheel 7, having peripheral meshing engagement with a gear wheel 8 secured to a shaft 9 projecting forwardly and having rotatable bearing at 10 in the adjacent brace bar 4. Fixed on the shaft 9 is a pinion 101 having meshing engagement with a gear wheel 11, keyed on an elongated shaft 12 extending longitudinally of the machine and having adjacent one end a bearing 13 conveniently an integral part of the adjacent brace bar 4, and at its opposite end a similar bearing in the other brace bar 4 at the rear of the machine. Since the shaft 12 has associated instrumentalities whereby each of the several parts of the machine are governed and controlled in their operation, I conveniently term said shaft 12 the main operating shaft.

The feeding mechanism for the cans to be labeled preferably comprises the following parts: Suitable bracket supports which may take the form of oppositely inclined legs 14 with flanges 14ª, arranged to rest on the upper surface of the sides of the rectangular support 2, are secured in any desired manner as by bolts 14ᵇ to the inner surface of said sides. The upper terminals of said legs have an opening at their connection to form a bearing for an elongated guide bar 16, mounted in said bearing for longitudinal sliding movement and connected by vertical arms 17 to a longitudinally extending bar 18 constituting the feeder for the can. Guides 19 upon opposite sides of the feeder bar 18 and slightly thereabove constitute the rest support or runway for the cans, and have upright flanges 19ª one of which flanges has an overhanging lip 19ᵇ arranged to engage over the usual peripheral flange formed by the cap on the can. By this construction, the can will be maintained in an upright position and free from disengagement or tilting throughout its feed. Pusher dogs 20 conveniently arranged in pairs connected at their lower ends by a bar 20ª extending over the under surface of the feeder bar 18 are pivotally connected as by pintles 21 secured to said bar. Suitable spring members 22 being mounted on said pintles and connected to a part carried thereby and to the dogs, normally tend to hold said dogs in upright, or in, position to engage the rear of the cans. The feeder bar 18 and the pusher dogs carried thereby receive reciprocating movement in a manner to be described, and said dogs are constructed and arranged to, in their forward movement, push the cans forwardly in front thereof along the guide rests 19, and in the rearward movement the dogs swing against the tension of the springs about their axes to a point below the path of the cans, the springs readily yielding to the pressure of the cans, which are held against vertical movement by the overhanging lip 19ᵇ on the can rests as described. The can rests 19 are supported in position by extensions 14ᶜ on the legs 14, and in order to accommodate the said rests to cans of varying width, flat spring members 19ᶜ mounted in a recess 19ᵈ of one of the flanges 19ª of the can rests, project inwardly from said flanges into the path of the can, the inward movement of said springs being limited by recesses 19ᵉ in the base of said can rests.

The can timing or escapement mechanism is conveniently constructed as follows: It is customary to feed the cans by a rolling action to the main feed, and to this end an inclined trough 23 is provided at the front end of the machine, conveniently pivoted at 23′, to a bracket 24 on a support 25, which latter is secured in any desired manner to the rectangular frame 2. A bracket support 27 is pivotally connected at 26 adjacent the outer end of the inclined trough and has a detachable engagement at its opposite end to the support 25, as by means of a hollow terminal on the support 27 and a projecting lug on the support 25 arranged to fit within said hollow terminal. In this way, the inclined trough may be swung about its pivot 23′ by disengaging the bracket support 27 from the lug on the support 25, and thereby assume a position against the end of the machine when the apparatus is not in use. An additional foot rest or bracket 27ª may be provided as an additional support, the same connecting at its respective ends to the bracket 24 and the end of the rectangular frame 2. Upright members 28 are connected to the opposite side of the inclined trough adjacent its delivery end, and extending therebetween is an oscillatory rod 29, arranged at a point above the feeding cans. Extending longitudinally of the runway is a spring arm 30, having a pressure foot 31 at one end, which is formed of yieldable material preferably rubber, the spring arm having at its opposite end a pin and slot connection 32 with an overhanging arm 33 secured to an operating bar or rod 34, having a cam engaging shoe 35 at its lower end engaging a cam 36 carried by the main operating shaft 12. The operating bar or rod receives reciprocatory movement through the medium of said cam and in turn the overhanging arm 33 will be reciprocated, thereby imparting alternate vertical movements to the opposite ends of the spring arm 30, which oscillates with the rod 29. The spring arm is so arranged and positioned that the presser foot 31 will engage one can to hold the same from movement while the forward end of the spring arm yields under the upward movement of the operating rod 34 to disengage the next preceding can in the runway. Upon the reverse movement of the operating rod 34, the spring arm moves about its pivot whereby the presser foot end thereof is raised from engagement with the succeeding can, which is now free to move downwardly until it contacts with the overhanging bar or arm 33 connected to the forward end of the spring arm as described. In this way the feed of each can is timed so that they are accurately spaced one from the other, which spaced position they will maintain throughout the operation of the machine, whereby the operation upon one can will not interfere with the operations on the others.

Since the present machine is designed primarily for placing the labels upon the heads or ends of the cans, means are interposed between the inclined trough and the feed support for righting the can, which said means may be of any desired construction, though conveniently comprising curved bars 36ª, one lower than the other, for engaging the under surface of the cans adjacent the opposite ends, thereby tilting the cans, an auxiliary bar 36ᵇ to the outside of and above the lower bar constituting with the upper bar before mentioned guides for the uprighted can, as it moves into engagement with the supporting bars or rests 19.

Means for imparting reciprocating movement to the feeding bar 18 comprises a cam 37 on the operating shaft 12 adapted to be engaged by an anti-friction bearing 38 rotatably mounted on the side of a rod 39 having a slotted engagement with said shaft 12, at 40. The rod 39 has a loose sliding engagement at its upper end with a bearing 41 secured to a stationary part of the machine and connected intermediate the ends of the rod 39 for movement therewith as by an offset arm 42 sleeved thereon, is an auxiliary rod 43 extending longitudinally of the rod 39, the offset arm 42 also having a sleeved connection with the auxiliary rod, and being adjustably held to the respective rods as by adjustable bolts 42ª. A rack 43ª is formed on one side of the auxiliary arm and is designed to mesh with a segment gear 44, rotatably mounted on a shaft 45, supported in bearings comprising a stationary part of the machine. A supplemental segment gear 46 connected with the gear 44 for relative adjustment as by the pin and slot connection 45ª, is designed to move with the gear 44 and adapted to mesh with a rack 46ª carried by the guide bar 16. In action, the supplemental segment gear 46, by its movement impelled by the connected segment gear 44 and cam actuated rod reciprocates the rack 46ª, thereby imparting backward and forward movement to the guide bar 16 and in turn the feed bar 18, for the purpose heretofore described. A spring member 47 connected at one end to a stationary part of the machine as at 48 and at its opposite end to an extension of the segment gear 46, is provided to insure the return movement of the segment 46 should the anti-friction bearing of the rod 39 fail to lower in following the reduced portion of the cam 37. By means of the adjustable connection between the two segments, referred to, it is possible to adjust the throw of the feed bar 18 and thereby accurately position the respective cans relative to the operating instrumentalities of the labeling mechanism about to be described.

An open bearing 49 mounted on a stationary part of the machine constitutes a guide for an operating bar 50 having a slotted guide member 51 at its lower end, loosely fitted on the main operating shaft 12, and carrying an offset anti-friction bearing 52 engaging a cam 53 on the shaft 12 by which the rod is reciprocated. The rod 50 projects upwardly to a point above the can feed and is connected in any desired manner to a head 54, common to the pasting, label positioning, and label pressing instrumentalities about to be described, all of said instrumentalities being operated simultaneously through the medium of the rod 50 and connected head 54, the cam 53 operating to raise the rod, and a spring member 55 connected at its lower end as at 56 to a stationary part of the machine and at its upper end to the head 54 at 54ª insuring the lowering of the head as the anti-friction bearing engages the reduced portion of the can 53. A guide rod 50$^a$ extending longitudinally of the rod 50 and connected thereto by an offset arm 50$^b$ is arranged to slide loosely through a bearing 50$^c$ on a stationary part of the machine, as an additional guiding means for the rod 50 and tending to prevent any frictional holding action of the rod 50 in its bearing 49.

The pasting or glue applying apparatus is conveniently constructed as follows: A receptacle 57 adapted to contain paste, glue, or other adhesive substance is supported by a bracket 58 on the rectangular frame 2, a suitable covering member 59 being provided with an opening 59$^a$ for the insertion of the adhesive material and being cutaway at 59$^b$ for the protrusion of an adhesive carrier roll 60 arranged to alternately dip into the contained adhesive and in the path of an auxiliary adhesive carrier comprising an endless belt 61, suitably of rubber with which the roller 60 contacts. Below the belt 61 and slightly above the top of the upright cans to be operated upon is a holding and centering platen or plate 62 carried by upright bars 63 and 64, having slidable engagement as at 63$^a$ and 64$^a$ with a transverse bar 65 carried by a stationary head frame 66, supported by an upright member 67, on the rectangular frame 2. Springs 68, and 68$^a$ sleeved upon the rods 63 and 64 between collar 68$^b$ and a stationary part of the head frame 66 normally tend to hold the platen in elevated position. The said platen has an opening 69 therein positioned above the path of the can, the opening being of a size to correspond with the size of the label to be applied to the can head, and surrounding said opening is a recess 70 shaped to conform to the shape of the can which latter will fit in the recess when the centering plate is lowered, in a manner to be described. A presser foot 71 having a protruding compressible surface 72 of any desired material is positioned above the adhesive feed belt 61 in registration with the opening 69 of the platen 62, whereby when the foot 71 is lowered the compressible surface will force that portion of the endless adhesive carrier immediately therebelow through said opening and onto the top of the positioned can, it being understood that the endless adhesive belt is constructed of flexible material as stated, to admit of this operation. That portion of the presser foot 71 surrounding the compressible projection 72 engages the upper surface of the centering platen surrounding the opening 69 thereby lowering the centering platen when downward movement is imparted to the presser foot 71 through the medium of the movable head 54 with which the presser foot is connected by the rigid arm 71$^a$ on the head and a rod 72$^a$ projecting upwardly from the presser foot and slidably connected with the arm 71$^a$. A spring 73 is interposed between the presser foot and the arm 71$^a$ to accommodate for any excess pressure on the can head and thereby preventing any possible breakage of parts. It is noted that when the centering platen is in lowered position, the same will not only hold the can in registration therewith from movement, but will prevent the adhesive material from gaining access to the can head surface not to be occupied by the label. A rod 71$^b$ slidably mounted in an arm 72$^b$ and connected with arm 71$^a$ constitutes an auxiliary support for the rod 72$^a$, said rod adapted to contact against the tension of spring 72$^c$ with a stationary part of the machine.

The label holder, the label positioner, together with the label follower may be described as follows: 74 is a downwardly projecting arm secured at 75 to the movable head 54 and at 76 to a carrier frame conveniently an annular member 77 adapted to receive a label receptacle or support, a satisfactory arrangement of which comprises upper and lower annular members 78 with spacing bars 79 therebetween. The annular members 78 have openings 80 adapted for the reception of the labels, and novel means are provided for adapting the opening to different sized labels. In the instance illustrated, the opening for the labels is rectangular in shape for similarly shaped labels, and the relatively short ends of the labels are supported by plates 81 centrally arranged relative to the sides of the opening, though it is obvious that one or more of said plates may be employed. The plates 81 extend between the annular members of the case, and that plate at one end of the opening is shown as adjustable laterally through the medium of slotted brackets 82 carried by the plate 81 and secured by adjustable bolts 83 to the upper and lower annular members of the receptacle. It is obvious that a greater range of adjustability may be obtained by likewise adjustably supporting the plate or plates at the opposite end of the receptacle, though the same is shown as fixed in any desired manner. The sides of the labels are supported by plates or bars 84 extending between the annular members of the label receptacle, those upon one side being mounted for lateral adjustment by brackets 85 slotted to receive adjustable bolts 86 engaging the upper and lower annular members of the receptacle, it being understood that each of the bars may be adjustable, though those upon one side only of the receptacle are so shown. It is also noted that a single bracket is common to all of the bars on each side. The plates 81 have adjacent their lower ends relatively short inwardly extending lips or flanges 87 constituting rests for the labels, which, owing to the construction of the underlying lips may be readily slipped thereover.

The label receptacle has a plurality of outwardly extending vertical flanges or plates 88 enlarged at 89 to constitute an overhanging lip, for a purpose to be described. The carrier frame 77 has slotted guides or ways 90 adapted for the reception of the flanges 88 of the label receptacle for relative sliding movement. Projecting upwardly from the carrier frame 77 are bars 91 connected at their upper end by the head piece 92 arranged to support in a manner to be described, a rod 93 carrying a follower 94 adapted to rest upon the uppermost label in the cage. The follower rod 93 has a serrated surface 94', the serrations being closely associated, and there being preferably a serration for each contained label. An actuating member 96$^a$ with a projection rod 96 threaded thereto and held in adjusted position by thumb nut 96$^b$ is sleeved upon a plunger rod 97 and connected thereto for a limited relative sliding movement as by a pin and slot connection 98$^a$ and 98$^b$. The plunger rod 97 passes through an aperture in an arm 99 carried by the head piece 92 and projects thereabove for connection at 100 with one end of a lever 101 pivoted intermediate its ends between standards 102 projecting upwardly from the arm 99. Pivoted to the inner end of the lever by a pintle 103 is a dog 104 arranged at its free end to engage the serrations of the follower rod 93, the pintle 103 being extended upon one side of the bar cr dog and a spring member 105 being interposed between the collar 106 at the outer end of the pintle and dog for normally holding the latter in engagement with the follower rod. The said pawl or dog through its operative connection being constructed and arranged to impart downward movement to the follower rod by each operation a distance equal to the space between the serrations, the follower will lower to take up the space of each disengaged label. An auxiliary pawl or dog 107 is carried by a stationary arm secured to the standards 102, the pawl being pivotally connected to said arm and having associated therewith a spring 108 mounted on the extended pintle for the pawl as described with reference to the associated pawl 104, the spring normally holding the auxiliary pawl in engagement with the serrations and being mounted on a stationary arm to withhold the follower rod in the position to which adjusted by the pawl 104.

Means are provided whereby the plunger rod 97 will only operate to move the pawl 104 when a can is in proper position below the label carrier. To this end an abutment 109 is pivoted to one side of the guide 19, a spring 110 secured respectively to said abutment and the outer wall of the guide tending to normally hold the abutment in innermost position or in the path of the can to be engaged by the latter and swung about its pivotal connection into a position to be engaged by the rod 96. The abutment or contact when in this position will be engaged by the actuating rod 96, thereby exerting upward pressure against the tension of the spring 111 interposed between the rod 97 and arm 99, thereby operating the lever 101. The abutment 109 is notched at its free end as at 113 and a pin 114 on the guide fitting in said notch is intended to limit the movement of the abutment in either direction.

Means are provided whereby breakage of parts is prevented should the pressure on the follower shoe 93 exceed a predetermined amount, as when the labels are exhausted, and the follower engages the can, it being noted that the can when in this position moves the abutment into position to be engaged by the actuating rod 96. Therefore a spring member 115 is interposed between a collar 116 carried by the plunger rod 97 and a collar 117 on the actuating member 96$^a$, the tension of the spring being sufficient to normally hold the rod substantially immovable relative to one another, but should the pressure on the follower foot increase beyond the normal, or should the same be otherwise prevented from movement exerted by the lever arm 101, the spring 115 will be compressed and the parts 96 and 97 relatively moved, the pin and slot connection permitting this relative movement. In this way, the actuating rod may continue to operate without affecting the parts carried thereby. The rod 96 may be adjusted longitudinally of the sleeve 96$^a$ by grasping the thumbnut 96$^c$ and rotating in either direction according to whether it is desired to elevate or lower the same, it being noted that the said rod 96 has a threaded engagement with the sleeve 96$^a$. A thumbnut 96$^b$ threaded onto the rod 96 is provided to constitute a locking means for holding the rod 96 in its adjusted position.

In operation, the carrier is supplied with labels, the dogs or pawls 104 and 107 are removed from engagement with the follower rod by means of knobs 116 on the respective pawls, and the follower foot is manually lowered into position relative to the labels. It being understood that the actuating rod 96 is normally free from contact at its lower end, when a can assumes a position below the label carrier, the abutment is swung outwardly into position to be contacted by the lower end of the actuating rod 96. When the head 54 is lowered, it operates to simultaneously lower the label carrying frame 77 and with it the label receptacle and follower. As these parts are lowered the actuating rod 96 is simultaneously lowered and upon contacting with the abutment 109 will operate the follower as before described. When in lowered position, or in operative position relative to the can, the label receptacle, which has a relative sliding movement through the medium of its flanges 88 and slotted ways 90 in the frame 77 will assume a position slightly elevated relative to the carrier frame 77 as illustrated clearly in Fig. 5, it being noted that the overhanging lips 89 are spaced from their seats on the carrier frame 77. In this position pressure is exerted on the labels by the follower 94. Now assuming that upward movement is imparted to the frame 77 by the head 54, the frame and follower will have a movement independent of the label case equal to the space between the overhanging lips 89 on the cage and their seats 90$^a$ on the frame when in lowered position. The resultant lost motion provides means whereby for an interval all pressure on the labels is relieved while the same are held in contact with the registered can. Upon the further upward movement of the carrying frame 77, the overhanging lips 89 on the cage will be engaged by the frame and elevated, and by this movement the lowermost label previously brought into contact with the adhesive material on the can will adhere to the can and be separated from the remaining labels by slipping over the relatively short retaining lips 87 on the label receptacle, it being noted that this operation is made positive by reason of the fact that when the label is in position to be separated, the only weight on said label will be that of the superimposed labels themselves.

The label pushing or affixing apparatus preferably comprises the following parts: An arm 118 projects forwardly from the movable head 54 and constitutes a support for a plunger rod 119, slidably mounted thereon. A collar 119$^a$ constitutes means for limiting the downward sliding movement of the plunger rod and a spring 120 interposed between the arm 118 and a collar 121 on the rod 119 normally tends to hold the rod in lowermost position, though adapted to yield should excess pressure be exerted on the presser foot 122 at the lower end of the rod. The presser foot conveniently has a compressible surface 123 and to prevent direct contact of said surface with the labeled cans with the incident objections, an interposed yieldable platen or member 124 is provided suitably in the form of an endless belt of fabric material. The plunger rod receives reciprocations from the movable head 54 and the parts are so timed that when lowered the presser foot will contact through the interposed belt 124 the last labeled can automatically positioned through the feeding operation previously described directly beneath the plunger, thereby firmly affixing the label to the can. In this way, even those portions of the label which overlap the lips 87 on the case will also be affixed to the can.

Means for imparting movement to the adhesive belt 61 and the affixing platen 124 comprised the following: The main operating shaft 12 is provided with an additional cam 125 adapted to be contacted with an offset anti-friction member 126 connected to the side of an operating rod 127 sleeved as by a slot 128 on said shaft 12. An open guide 129 secured to a stationary part of the frame fits loosely about the rod adjacent the upper end and connected to said upper end as by an offset arm 130 is a rack bar 131 arranged to receive reciprocation by said cam and intermeshing with a segment gear 132 loosely sleeved upon a shaft 133, which latter has a loose bearing in the upright bar 67 of the stationary head 66. Fixed upon the rear end of the shaft 133 adjacent the segment gear 132 is a ratchet wheel 134 conveniently having four notches 135 arranged to be engaged by a pivoted pawl 136 connected to the segment gear 132 by a pintle 137, a spring 138 interposed between the ratchet and a collar on said pintle tending to hold the pawl in engagement with the periphery of the cog wheel.

As thus far described, it will be observed that the movement of the shaft 133 will be intermittent each movement being dependent on the distance between the notches 135 on the wheel 134, the pawl 136 after moving the wheel 134 the required distance, being returned into engagement with the next succeeding notch on the wheel 134 by the return movement of the rack bar 131 permitted by the cam 125 and assisted by the spring 138$^a$ sleeved upon the rod 127. Upon said shaft 133 to the opposite side of the upright bar 67 is fixed a gear wheel 139 and pinion 140, the pinion 140 meshing with a gear wheel 141 fixed to the shaft 142 of the paste carrying roll 60. An idle pinion 143 on the upright 67, meshes respectively with the gear wheel 139 and a pinion 144 on a shaft 145 mounted for rotary movement on the upright 67. Pulleys 146 conveniently four in number are loosely supported on suitable shafts 147 on the stationary head 66 and are adapted to support the adhesive carrier 61 a belt tightener in the form of a pivotally mounted roller 148, being provided to take up the play of the belt and hold the same in frictional contact with the pulleys 146 for rotation therewith. Sprockets 149, one for each pulley 146, are secured to the pulleys and one of said sprockets is fixed to the shaft 145, and a sprocket chain 150 in engagement with the respective sprocket wheels imparts simultaneous movement thereto. A chain tightener in the form of a pivotally mounted roller 150ª, on a stationary part of the head 66 is adapted to take up the play of the sprocket chain. Upon the opposite side of the fixed head 67 are pulleys 151 usually four in number adapted to support the presser belt or platen 124, two of the pulleys being idlers, and the others conveniently enlarged and carrying sprockets 152, whereby the movement of one of said enlarged pulleys fixed to the shaft 145 is imparted to the other enlarged pulley through the medium of a sprocket chain 153. A suitable belt tightener 154 pivotally mounted on the fixed head 66 tends to hold the presser belt or platen in frictional contact with the pulley.

It will be appreciated that the adhesive belt 61 and the presser belt or platen 124 have a common drive and are simultaneously operated, and also that this movement is intermittent, the mechanism being designed to present a new surface of the respective belts to each can, for obvious reasons. Each of the belts 61 and 124 being loosely fitted over the supporting pulleys, the same may be readily slipped from off the same for cleansing or other purposes.

The delivery mechanism is conveniently constructed as follows: A bar 154′ is detachably secured as by bolts 155 to one of the guide bars or can rests 19 and extends therebeyond, the upper surface of the bar 154′ being in line with and constituting a continuation of the upper surface of said guide bar. A bracket arm 156 sleeved in a bearing 157 at the rear end of the rectangular frame 2 is held in adjusted position by a bolt 158 and upon the upper end of the arm 156 is a T-shaped support the upright arm 159 thereof being detachably sleeved on said arm 156 and held by bolt 160, and the transverse arms 161 varying in length and being hollow provide a support for a shaft 162 constituting a pivotal bearing or support for a run-way 163 secured to the shaft 162. When the runway is in elevated position or in position to receive the labeled cans, an elongated bar 164 pivoted at one end 165 to the outer end of the runway engages at its opposite end with a retaining lug or recess on the rear end of the frame as at 166.

By the construction just described, the labeled can upon reaching the projecting bar 154′ on one side of its lower surface, is free at its opposite side to tilt into rolling position into the runway to be delivered, it being noted that the can will in this position be ready to receive the ordinary side label, and mechanism for this purpose may be applied directly to the runway, which latter would then constitute the feed for the side labeling instrumentalities. With this result in view, the bar 154′ is constructed as to be equally applicable to either of the guides or can rests 19 and the supports for the runway are adjustable and detachable with the result that while the runway is shown in Fig. 18 as extending to the right of the guide bar, the T-shaped arm may be reversed, when the runway will assume a position slightly to the opposite side of the bar 154′, the said bar 154′ having been, however, previously removed and applied to the opposite guide 19 as shown in Fig. 17. By this construction, it will be appreciated that regardless of the reversed positions of the bar 154′ and runway 163, the can when tilted will be positioned directly on the runway for rolling movement, the positioning being aided by flaring ends 163ª of the flanges of the runway.

The general operation of the machine may be briefly recited as follows: Cans to be labeled are placed in the feeding trough or runway down which they roll until the lowermost one contacts with the forward end of the spring escapement 30, the next succeeding can being at this time beneath the compressible member 31 of said spring arm. The machine having been set in operation, the rod 34 is moved by the cam 36 against the tension of a spring 34ª interposed between a collar on said rod and its bearing 34ᵇ, to release the foremost can, while the next succeeding one is still held by the rear end of the arm. The rod is subsequently permitted to lower by the cam 36, being aided by said spring, when the succeeding can, being now free by the swinging of the spring arm about its pivot, will take the place of the previously discharged can, which latter is positioned upon the runway or can rest 19 in an upright position to be taken up and fed along the can rest by the pushers which by reciprocal movement are arranged to release one series of fed cans and engage the next succeeding series. The pushers are spaced so as to position the cans accurately relative to the labeling instrumentalities, that is, one can under each apparatus. When so positioned, the paste plunger, label carrier, and presser plunger will simultaneously move into operative relation to the cans, through the medium of the movable head 54 common to each of said parts, the follower 94 in the label receptacle being governed in its movement by the movement of the cans along the runway, and the paste belt 61 and presser belt 124 interposed between the respective plungers, and the cans, receiving intermittent movement by the ratchet 134 through the gear connection fully described, whereby a new surface of each of said belts will be presented to the successive cans. After the label is firmly affixed to the cans, the feeding movement of the latter is continued by the pushers 20 and delivered for rolling action on the delivery runway 163 through the medium of the interposed tilting bar or extension 154'. A protecting hood or casing B may be removably secured to the motor as by bolts b.

In shipping, or when not in use, the receiving and delivery runways may be swung about their pivotal connection against the ends of the machine.

We claim:

1. In a labeling machine, the combination of a runway adapted to feed cans or the like and an arm constructed and arranged at its respective ends to simultaneously engage and hold successive cans, and means for releasing said engagement.

2. In a labeling machine, the combination of a runway, of an arm above the runway of a length to extend over two cans or the like which are fed along the runway, a pivotal support for the arm intermediate its ends, and means whereby one of said arms may engage one can while the other engages the other can.

3. In a labeling machine, the combination of an inclined runway adapted to deliver cans or the like, an elongated arm arranged to holdingly engage at its respective ends succeeding cans, and a pivotal connection for said arm whereby one end of the arm may be released from its can while the other end of the arm will maintain its holding engagement on its engaged can.

4. In a labeling machine, the combination of a runway adapted to feed cans or the like, an arm constructed and arranged to simultaneously holdingly engage adjacent its respective ends two successive cans, releasing means for the arm, and means whereby as the forward can is released by one end of the arm, the next succeeding can is held from movement by the opposite end of the arm.

5. In a labeling machine, the combination of a runway adapted to feed cans or the like, and an elongated arm of resilient material constructed and arranged adjacent its respective ends to engage successive cans, and means for releasing said engagement on one can by flexing the arm.

6. In a labeling machine, the combination of a runway adapted for the reception of cans, an elongated arm of resilient material constructed and arranged adjacent its respective ends to engage and hold succeeding cans in the runway, and means for releasing the engagement of one end of the arm on one can while maintaining the holding engagement of the opposite end on the other can.

7. In a labeling machine, the combination of a runway adapted to feed cans or the like, of a spring pressed arm arranged to exert holding tension on a plurality of cans, and means for overcoming the holding tension on one can while maintaining it on another.

8. In a labeling machine, the combination of a runway adapted to feed cans or the like, of a spring pressed arm arranged to exert adjacent to said ends, holding tension on the succeeding cans, means for releasing the holding tension of the forward end of the arm on the first can without removing the holding tension on the next succeeding can, and means for subsequently releasing said other can.

9. In a labeling machine, the combination of a runway adapted to feed cans or the like, of an elongated arm pivoted intermediate its ends above the runway, said arm having a yielding portion adjacent one end for engaging one can and a part at its opposite end for engaging the succeeding can, and means for releasing said resilient engagement on one can while maintaining the cooperating holding engagement on the succeeding can.

10. In a labeling machine, the combination of an inclined runway for cans, an upright support on the runway, a spring arm pivoted intermediate its ends to said support and above the cans, said arm being constructed and arranged to exert pressure at adjacent opposite ends on two succeeding cans, and means engaging one end of the arm to release the same from one can while the next adjacent can is being held by the opposite end of the arm.

11. In a labeling machine, the combination of a runway for cans, an upright support on the runway, a spring arm pivoted intermediate its ends to said support and above the cans, said arm being constructed and arranged to engage adjacent its opposite ends two succeeding cans, and cam actuated means for engaging one end of the arm to release the same from one can while the next adjacent can is being held by the opposite end of the arm.

12. In a labeling machine, the combination of a runway for cans, of an arm of spring material fixed to a support above the cans and arranged at one end to engage directly with a can and hold the same from movement, means for bending said spring to release the can.

13. In a can labeling machine, the combination of a runway for feeding cans, of an upright support on said runway, an arm pivoted intermediate its ends to the support and having a resilient part at one end to engage one can and a compressible member at its opposite end to engage the succeeding can, means for releasing said resilient part to release the forward can without disturbing the holding action of the compressible member on the next succeeding can, and means for subsequently moving the arm about its pivot to release said other can.

14. In a can labeling machine, the combination of a runway for feeding cans, of an upright support on said runway, an arm pivoted intermediate its ends to the support and having a resilient part at one end to engage one can and a compressible member at its opposite end to engage the succeeding can, cam actuated means for releasing said resilient part to release the forward can without disturbing the holding action of the compressible member on the next succeeding can, and for subsequently moving the arm about its pivot to release said other can.

15. In a labeling machine, labeling instrumentalities, a rigid support for holding the cans upright below the labeling instrumentalities, rigid means for preventing tilting of the cans and a feed movable longitudinally of the support to move the cans into operative position relative to the labeling instrumentalities.

16. In a labeling machine, the combination of labeling instrumentalities, a support for a plurality of cans having a longitudinally extending opening and an overhanging lip on the support for engaging over the flange of the can to hold the same upright, and means for feeding the cans along said support into operative position relative to the labeling instrumentalities, including pusher arms projecting through said opening, with means for reciprocating said arms, and a spring connection for each arm permitting independent yielding movement.

17. In a labeling machine, the combination of labeling instrumentalities, a support for a plurality of cans having a longitudinally extending opening, and means for feeding the cans along said support into operative position relative to the labeling instrumentalities, including pusher arms projecting through said opening, and normally arranged in the path of the cans, means for operating said arms to move the cans forwardly and for returning said arms to a position to engage the next succeeding cans, means whereby during the returning movement, the arms are moved out of the path of the cans, by the latter, and means for holding the cans against vertical movement while the arms are being turned.

18. In a labeling machine, the combination of labeling instrumentalities, a support for a plurality of cans having a longitudinally extending opening, and means for feeding the cans relative to the labeling instrumentalities comprising a plurality of pusher arms projecting through said opening into the path of the cans, the said arms being pivoted to swing in one direction, whereby they may move into and out of the path of the cans, spring means for normally holding the arms in pushing position, and means whereby the cans will act in opposition to said spring means to release the arms.

19. In a labeling machine, labeling instrumentalities, and a can feed comprising a support for the cans having a longitudinally extending opening, a plurality of pusher arms for the cans adapted to project upwardly through said openings and into the path of the cans, spring means for holding the arms upright, a connecting rod for the pushers having slidable engagement with a stationary part of the machine, cam actuated means for reciprocating the rod, and means whereby as said pushers move forwardly they impart like movement to the cans, and as they move rearwardly they are positioned by the cans out of the path of said cans and into the path of the succeeding cans.

20. In a labeling machine, labeling instrumentalities, and a can feed comprising a support for the cans having a longitudinally extending opening, a plurality of pusher arms for the cans adapted to project through said openings and into the path of the cans, a connecting rod for the pushers having slidable engagement with a stationary part of the machine, cam actuated means for reciprocating the rod, interposed mechanism for adjusting the throw of the rod, and means whereby as said pushers move forwardly they impart like movement to the cans, and as they move rearwardly they are positioned out of the path of said cans and into the path of the succeeding cans.

21. In a labeling machine, labeling instrumentalities, and a can feed comprising a support for the cans having a longitudinally extending opening, a plurality of pusher arms for the cans adapted to project through said openings and into the path of the cans, a connecting rod for the pushers having a slidable engagement with a stationary part of the machine, cam actuated means for reciprocating the rod, and means whereby as said pushers move forwardly they impart like movement to the cans, and as they move rearwardly they are positioned by the cans out of pushing engagement therewith and when released by the cans will assume a position in operative pushing relation with the succeeding cans, and rigid means for holding the can from vertical movement as the pusher arms are returned.

22. In a labeling machine, labeling instrumentalities, and a can feed comprising a support for the cans having a longitudinally extending opening, a plurality of pusher arms for the cans adapted to project through said openings and into the path of the cans, a connecting rod for the pusher having slidable engagement with a stationary part of the machine, cam actuated means for reciprocating the rod, means whereby as said pushers move forwardly they impart like movement to the cans, and as they move rearwardly they are positioned by the cans out of pushing engagement therewith and when released by the cans will assume a position in operative pushing relation with the succeeding cans, and means for holding the cans against vertical movement during the returning operation of the arms.

23. In a can head labeling machine, labeling instrumentalities positioned above the path of the cans, a longitudinally extending support arranged below the said labeling instrumentalities, pusher arms arranged to project through said support and into the path of the cans, means for reciprocating said pusher arms, and means whereby as said pusher arms move forwardly they will impart forward movement to the cans and as they are returned they will be moved by the cans out of the path thereof, and retaining lugs on the support for engaging the cans and preventing the tilting thereof during the return of the arms.

24. In a can labeling machine, labeling instrumentalities, and a can feed comprising a support, a feed bar movable relative to the support, pusher arms on the bar arranged to engage the cans, and means for reciprocating the feed bar including a rack carried thereby, a segment in engagement therewith, and means for moving the segment.

25. In a can labeling machine, labeling instrumentalities, and a can feed comprising a support, a feed bar movable relative to the support, pusher arms on the bar arranged to engage the cans, means for reciprocating the feed bar including a rack carried thereby, a segment in engagement therewith, means for moving the segment, and means for adjusting the movement of the segment.

26. In a can labeling machine, labeling instrumentalities, means for feeding cans thereto comprising a reciprocating feed bar having means for engaging the can, means for reciprocating the bar including a rack carried by the bar, a suitably mounted segment, an auxiliary segment carried by the first mentioned segment, and an actuating rack in engagement with the auxiliary segment.

27. In a can labeling machine, labeling instrumentalities, means for feeding cans thereto comprising a reciprocating feed bar having means for engaging the can, means for reciprocating the bar including a rack carried by the bar, a suitably mounted segment, an auxiliary segment carried by the first mentioned segment, and an actuating rack in engagement with the auxiliary segment, the auxiliary segment being adjustably connected to said first mentioned segment.

28. In a can labeling machine, labeling instrumentalities, means for feeding cans thereto comprising a reciprocating feed bar having means for engaging the can, means for reciprocating the bar including a rack carried by the bar, a suitably mounted segment, an auxiliary segment carried by the first mentioned segment, and an actuating rack in engagement with the auxiliary segment, the auxiliary segment being adjustably connected to said first mentioned segment, and a cam actuated rod for the last mentioned rack.

29. In a can labeling machine, labeling instrumentalities, in combination with a rotary shaft having a cam thereon, an upright rod having a part to be engaged by said cam whereby the rod is reciprocated, a bearing for the rod, a rack bar carried by the rod, a segment mounted for rotary movement meshing with said rack, an auxiliary segment connected to the first mentioned segment, a rack bar arranged to be operated by the auxiliary segment and a can feed actuated by said last mentioned rack bar, for delivering cans to said labeling instrumentalities.

30. In a can labeling machine, the combination of labeling instrumentalities a rotary shaft having a cam thereon, an upright rod having a part to be engaged by said cam whereby the rod is reciprocated, a bearing for the rod, a rack bar carried by the rod, a segment mounted for rotary movement meshing with said rack, an auxiliary segment adjustably connected to the first mentioned segment, a rack bar arranged to be operated by the auxiliary segment, and a can feed actuated by said last mentioned rack bar, for delivering cans to the labeling instrumentalities.

31. In a can labeling machine, the combination of labeling instrumentalities a rotary shaft having a cam thereon, an upright rod having a part to be engaged by said cam whereby the rod is reciprocated, a bearing for the rod, a rack bar carried by the rod, a segment mounted for rotary movement meshing with said rack, an auxiliary segment connected to the first mentioned segment, a rack bar arranged to be operated by the auxiliary segment, a can feed actuated by said last mentioned rack bar for delivering cans to the labeling instrumentalities, and a spring connected with the auxiliary segment for normally holding the first mentioned rod in engagement with the cam on the shaft.

32. In a can labeling machine, the combination of labeling instrumentalities a rotatable shaft, a reciprocating rod having a cam engagement with said shaft, a suitable bearing for the upper end of the rod, an auxiliary rod extending longitudinally of the first mentioned rod, and an offset arm for connecting the rods one to the other, a rack on the auxiliary rod, a segment gear in engagement with the rack and rotatably mounted on a stationary part of the machine, an auxiliary segment adjustably secured to the first mentioned segment, and a reciprocating can feed for delivering cans to said labeling instrumentalities, including a bar having a rack in engagement with the auxiliary segment.

33. In a labeling machine, the combination of labeling instrumentalities, an inclined runway permitting the cans to have rolling movement along the same, a support arranged below the labeling instrumentalities for the cans delivered from the runway a reciprocating feed for imparting intermittent movement to the cans along said support into operative position relative to the labeling instrumentalities, and means interposed between the runway and support for moving the cans from a rolling position in the runway to an upright position on said support.

34. In a labeling machine the combination of labeling instrumentalities, an inclined runway permitting the cans to have rolling movement along the same, a support arranged below the labeling instrumentalities for the cans delivered from the runway, a reciprocating feed comprising a plurality of separated pushers slidable relative to the support, means for reciprocating said pushers to intermittently move the cans along said support into operative position relative to the labeling instrumentalities, means intermediate the runway and support for moving the cans from a rolling position in the runway to an upright position on said support, and means whereby the cans will when tilted assume a position one between each pusher of the feed.

35. In a labeling machine, feeding mechanism for the cans, a movable paste feed adapted to travel over the path of the cans, means whereby one portion of said feed may be moved relative to its remaining portion to contact with the cans while the remaining portion of said feed is spaced from contact with the cans.

36. In a labeling machine, feeding mechanism for the cans, a paste feed, a platen interposed between the cans and paste feed and having a recess or opening therein, and means for projecting the feed through said opening and into contact with the can.

37. In a labeling machine, feeding mechanism for the cans, a paste feed, a platen interposed between the can and paste feed and having a recess or opening therein, and means interposed between the feed and can for engaging one portion of the can and holding the same against movement, and means for projecting the paste feed into contact with another portion of the can.

38. In a labeling machine, feeding instrumentalities for the cans, a paste feed, a presser platen having a centering recess arranged to engage the cans and an opening within the recess, and means for projecting said paste feed through said opening into contact with the cans, and means for intermittently moving said paste feed to present new surfaces to successive cans.

39. In a can head labeling machine, feeding instrumentalities for the cans, an endless belt adapted to contain a supply of paste or the equivalent thereof, a resiliently held presser platen interposed between the belt and can to be pasted and having an opening therein above said can, a presser foot adapted to force a portion of said belt through said opening into contact with the can and to move the platen into holding engagement with the can, and an intermittent feed for the belt.

40. In a can head labeling machine, feeding instrumentalities for the cans, a paste feed, a presser platen interposed between the paste feed and the can to be pasted and having an opening therein above the can, means for projecting the feed through said opening onto the can, and for moving the platen into holding contact therewith, means for releasing the paste feed contact, and means for producing an automatic return for the platen.

41. In a labeling machine, the combination of a can feed, of a presser foot, a flexible paste feed, means for moving the presser foot to contact the paste feed with the can to be labeled, and means interposed between the paste feed and can for holding the latter from movement.

42. In a labeling machine, the combination of a can feed, of a presser foot, a flexible paste feed, means for moving the presser foot to contact the paste feed with the can to be labeled, and holding means for the can movable into operative position by said presser foot.

43. In a labeling machine, the combination of a can feed, of a presser foot, a flexible paste feed, means for moving the presser foot to contact the paste feed with the can to be labeled, and a resiliently supported holding platen interposed between the presser foot and can.

44. In a labeling machine, the combination of a can feed, of a presser foot arranged above the cans, a member adapted to contain paste movable across the path of the cans and below the presser foot, a platen interposed between the paste feed and the can to be pasted and having an opening therein, and means for reciprocating the presser foot whereby the paste feed is projected through the opening of the platen into contact with the can.

45. In a labeling machine, a can support and a label applier above the support comprising a carrier frame, a label receptacle and means for mounting the receptacle on the frame whereby it may be removed including a guideway carried by one part and a flange carried by the other, and an overhanging lip on the flange.

46. In a labeling machine, a can support and a label applier above the support comprising a carrier frame, a label receptacle and means for mounting the receptacle on the frame whereby it is removable, the label receptacle having a sliding engagement with the frame, and means for moving the frame and receptacle into operative position relative to the can.

47. In a labeling machine, a can support and a label applier above the support comprising a carrier frame, a label receptacle freely slidable relative to the frame in one direction, a follower within the receptacle, means for moving the follower independent of the receptacle, and means independent of the follower for moving the frame and receptacle into operative position relative to a can on said support.

48. In a labeling machine, the combination of feeding instrumentalities, a receptacle adapted to support a supply of labels, relatively short stationary lips intermediate two of the sides of the receptacles, a label follower, means for moving the receptacle and follower whereby the latter will exert pressure on the labels and the lowermost label engage the can, means for releasing the pressure of the follower and means for subsequently returning the label receptacle, whereby all of the labels save the one in engagement with the can will be removed by the stationary lips of the receptacle.

49. In a can head labeling machine, feeding mechanism for the cans, means for supporting the cans in upright position and preventing tilting movement, a label carrier, means for moving the same into operative position relative to the fed cans, pressure exerting instrumentalities for said labels, and means for releasing said pressure without removing said carrier.

50. In a labeling machine, feeding instrumentalities for the cans, a label receptacle, a carrying frame connected for movement with and independent of the receptacle, and a follower within the receptacle, and means for moving the follower independent of the frame, by a step by step movement.

51. In a labeling machine, a frame carrier mounted for reciprocatory movement, a label receptacle slidably connected to the frame whereby as the frame is lowered the receptacle will contact the can and be slightly elevated relative to the frame, and whereby as the frame is elevated the receptacle will have a lost motion, the frame subsequently raising the receptacle and lifting the lowermost label on the can, and a presser foot slidably connected to the frame.

52. In a labeling machine, feeding instrumentalities for the cans, a lable receptacle, a label carrying frame, a label follower connected for movement with and independent of the frame to exert pressure on the labels when brought into engagement with the cans, means for imparting forward movement to the frame, which latter imparts similar movement to the follower and receptacle, means whereby as the frame and follower are returned, the receptacle will have a period of rest, and means for automatically imparting intermittent movement to the follower in the receptacle.

53. In a labeling machine, a can support, a label carrier, means for moving the label carrier in position whereby the lowermost label will contact with a surface of the can, relatively short immovable lips upon opposite sides of the carrier to overlap the lowermost label, and means for withdrawing the carrier, said means permitting the labels to remain temporarily stationary whereby the only weight thereon will be that of the superimposed labels.

54. In a labeling machine, a can support, a receptacle adapted to contain a supply of labels, the receptacle being open at its ends and having at its lower end relatively short stationary retaining lips intermediate its sides engaging slightly over the under surface of the lowermost label, means for moving the receptacle to a point adjacent the can whereby said lowermost label and said retaining lips will engage the upper surface of the can, movable means for exerting pressure on the labels, and means whereby on the return movement of the receptacle the labels are freed from pressure permitting the lowermost label to slip over said lips and remain in contact with the can.

55. In a labeling machine, a can feed, pasting instrumentalities, means for positioning a label on a previously pasted can, comprising a frame carrier mounted for reciprocatory movement, a label receptacle slidably connected to the frame whereby as the frame is lowered the receptacle will contact the can and be slightly elevated relative to the frame, and whereby as the frame is elevated the receptacle will have a lost motion, the frame subsequently raising the receptacle and lifting the lowermost label on the can, and a presser foot slidably connected to the frame.

56. In a can labeling machine, feeding instrumentalities for the cans, a label receptacle a carrying frame adapted to move the receptacle with a supply of labels in operative relation to the can, and means for adjusting the sides of the receptacle independent of the frame to adapt it to various sized labels.

57. In a can labeling machine, feeding instrumentalities for the cans, a label receptacle adapted to move a supply of labels in operative relation to the can, means for adjusting the sides of the receptacle to adapt it to various sized labels, comprising upright support on the receptacle mounted to constitute the inner wall thereof, and means for adjusting one of said supports laterally, a carrying frame for the receptacle and a slidable connection between the frame and a stationary part of the receptacle.

58. In a labeling machine, can feeding instrumentalities, a label receptacle adapted to move a supply of labels into operative position to the cans, said receptacle comprising spaced ring members, connecting arms extending therebetween and constituting guides for the labels, and means for adjusting said arms radially upon said ring members.

59. In a labeling machine, can feeding instrumentalities, a label receptacle adapted to move a supply of labels into operative position to the cans, said receptacle, comprising spaced ring members, connecting arms extending therebetween, means for adjusting said arms laterally, comprising offset feet on the arms, and means for adjustably connecting said feet to the rings.

60. A labeling machine comprising a can support, and a label feed, the latter comprising an annular frame having vertically extending guides, means for moving the frame toward and from the can a label receptacle having projections slidably engaging said guides for movement with and independent of the frame.

61. A labeling machine comprising a can support and a label feed, the latter comprising an annular frame having vertically extending slots, a label receptacle within the frame having projections slidably engaging said slots, and an overhanging lug on the receptacle engaging over the frame, with means for imparting movement to the frame.

62. In a labeling machine, the combination of a can feed and means for depositing labels on the fed cans comprising a receptacle adapted to contain a supply of labels, a follower in the receptacle, actuating devices including a reciprocating rod for moving the follower a predetermined distance, means for normally rendering said devices inactive, and a movable contact for said rod actuated by the moving can for rendering said devices operative.

63. In a labeling machine, the combination of a can feed and means for depositing labels on the fed cans comprising a receptacle adapted to contain a supply of labels, a follower in the receptacle, an operating member for successively moving the follower a positive distance, and controlling devices for the operating member governed by the can in its movement, said devices including a movable contact arranged to move into and out of the path of said operating member.

64. In a labeling machine, the combination of a can runway, a label receptacle and follower means for feeding the follower a predetermined distance, said means including a reciprocating rod, a pivoted contact normally arranged in the path of the cans and out of the path of said rod, and said contact being adapted to be moved outwardly into position to be contacted by said rod by the passing can, whereby the rod is actuated to move the follower.

65. In a labeling machine, a can feed, a label receptacle, a follower, a movable abutment, an actuating rod for the follower arranged to engage said abutment, means for moving the follower, and means whereby the abutment may be moved into and out of the path of the rod.

66. In a labeling machine, a can feed, a label receptacle, a follower, a movable abutment, an actuating rod for the follower arranged to engage said abutment, means for moving the follower, means whereby the abutment may be moved into and out of the path of the rod, and means operating under excessive pressure to prevent the actuating rod from imparting further movement to the follower.

67. In a labeling machine, a can feed, a label receptacle, a follower, a movable abutment, an actuating rod for the follower arranged to engage said abutment, means for moving the follower, means whereby the abutment may be moved into and out of the path of the rod, and means operating under excessive pressure to prevent the actuating rod from imparting further movement to the follower, the said means being controlled by the moving can.

68. In a labeling machine, the combination of a can feed, a label receptacle, a label follower, a pivoted abutment movable into and out of the path of the fed can, and an actuating rod for the follower independent of and controlled by said abutment in one of its limits of movement.

69. In a labeling machine, the combination of a can feed, a label receptacle, a label follower, a pivoted abutment movable into and out of the path of the fed can, an actuating rod for the follower having a part unconnected with and adapted to engage the abutment in one of its positions of movement, and means whereby said abutment is governed in its movement by the passing can.

70. In a labeling machine, the combination of a can feed, a label receptacle, a follower, an actuating rod a pivoted abutment movable transversely of the movement of the rod and into and out of the path of the fed can, the actuating rod for the follower being adapted to contact with said abutment in one of its limits of movement, and means whereby said abutment is governed in its movement by the passing can.

71. In a labeling machine, the combination of a can feed, a label receptacle, a follower, a spring actuated pivoted abutment normally in the path of the can and arranged to be moved out of the path thereof by the can, and an actuating feed device for the follower set into operation by the abutment in the last mentioned position, the actuating device being normally out of contact with the abutment.

72. In a labeling machine, the combination of a can feed, a label receptacle, a follower, a spring actuated pivoted abutment normally in the path of the can and arranged to be moved out of the path thereof by the can, and an actuating feed device for the follower set into operation by the abutment in the last mentioned position, and safety instrumentalities operating under excessive pressure of the follower to prevent further movement of the latter by the actuating rod should the rod be in operative position relative to said contact.

73. In a labeling machine, the combination of a cam feed, a label receptacle, a follower, a spring actuated pivoted abutment normally in the path of the can and arranged to be moved out of the path thereof by the can, an actuating feed device for the follower set into operation by the abutment in the last mentioned position, and a yieldable part in the actuating device operating under excess strain.

74. In a labeling machine, the combination of a can feed, means for applying labels to the cans, and a presser member operating on the applied labels, means for moving the presser member into and out of contact with the applied label, the presser member being constructed and arranged to present a different operating surface to successive cans.

75. In a labeling machine, the combination of a can feed, means for applying labels to the cans, and a presser member movable over the labeled can, means for moving the presser member toward and from the applied label, and means whereby a new surface is presented to successive cans.

76. In a labeling machine, the combination of a can feed, means for applying labels to the cans, and a presser member movable over the labeled cans, whereby a new surface is presented to successive cans, and means for operating said member intermittently.

77. In a labeling machine, a support for the cans, label applying instrumentalities, and means for pressing the applied labels including a member movable across and over the labeled surface of the cans, means for moving the member into contact with the cans, and means for subsequently moving another portion of the member into contact with another can.

78. In a labeling machine, feeding mechanism for the cans, label applying instrumentalities, a presser mechanism including an endless belt adapted to play across the label on the can, means for moving a portion of the belt into and out of the path of the can, and means for moving a different portion of said belt into contact with successive cans.

79. In a labeling machine, feeding mechanism for the cans, can head label applying instrumentalities, presser mechanism including an endless belt adapted to play across the label on the can, means for operating the belt intermittently to move a different portion thereof in position relative to the can, and presser exerting means for the belt, and a movable member engaging the last mentioned means for reciprocating the same to force the belt into contact with the label on the can.

80. In a labeling machine, feeding mechanism for the cans, label applying instrumentalities, and presser mechanism including a presser foot for affixing the applied label, and an independent bearing member interposed between the presser foot and labeled can.

81. In a labeling machine, feeding mechanism for the cans, label applying instrumentalities, and presser mechanism including a presser foot for affixing the applied label, and a movable member interposed between the presser foot and can with means for moving the member to present a new surface to the succeeding can.

82. In a labeling machine, feeding mechanism for the cans, label applying instrumentalities, and presser mechanism including a presser foot for affixing the applied label, and a flexible member interposed between the presser foot and can with means for moving the member to present a new surface to the succeeding can.

83. In a labeling machine, a can support, label affixing instrumentalities comprising a presser foot and a flexible member unconnected with and interposed between the presser foot and can and normally above the latter, and means whereby the flexible member is moved into contact with the can by the presser foot.

84. In a labeling machine, a can support, label affixing instrumentalities comprising a yieldably supported presser foot and an independent flexible member interposed between the presser foot and can and normally above the latter, and means whereby the flexible member is moved into contact with the can by the presser foot.

85. In a labeling machine, means for applying labels to the cans, an endless belt, rollers for the belt, means for imparting rotary movement to the belt whereby the same is moved across the path of the labeled cans, means for moving the labeled cans successively to said belt, and means for forcing a portion of the belt into contact with the cans.

86. In a labeling machine, means for applying labels to the cans, an endless belt, rollers for the belt, means for intermittently imparting rotary movement to the belt whereby the same is moved across the path of the labeled cans, means for moving the labeled cans successively to said belt, and means for forcing a portion of the belt into contact with the cans.

87. In a labeling machine, means for applying labels to the cans, a can feed, a presser foot arranged to affix the applied label, a member interposed between the foot and can, means for moving the foot toward and from the can, and means for imparting movement to the member as the foot is released.

88. In a labeling machine, means for applying labels to the cans, a can feed, a presser foot arranged to affix the applied label, a member interposed between the foot and can, means for moving the foot toward and from the can, and means whereby the member will present a different surface to succeeding cans.

89. In a can head labeling machine, the combination of a can feed, and means for holding the cans upright and preventing tilting movement thereof, a vertically movable head, pasting, label applying and label pressing instrumentalities carried by the head, and means for reciprocating the head whereby as one can is pasted, a label is simultaneously applied to a previously pasted can, and pressure is exerted on a previously labeled can.

90. In a can labeling machine, a can feed, pasting instrumentalities including an endless belt, compressing instrumentalities including an endless belt, and interposed label applying instrumentalities.

91. In a can labeling machine, a can feed, pasting instrumentalities including an endless belt, compressing instrumentalities including an endless belt, and interposed label applying instrumentalities, means for simultaneously moving said instrumentalities to and from the fed cans, and a common drive means for the belts.

92. In a can labeling machine, a can feed, pasting instrumentalities including an edless belt, compressing instrumentalities including an endless belt and interposed label applying instrumentalities, a common head for the instrumentalities, means for reciprocating the head, and means for operating the belts intermittently.

93. In a can labeling machine, a can feed, pasting instrumentalities including an endless belt, compressing instrumentalities including an endless belt, and interposed label applying instrumentalities, a common head for said instrumentalities, means for reciprocating the head, and independent means for rotating the belts.

94. In a labeling machine, a can feed, pasting instrumentalities, label applying instrumentalities, and label presser instrumentalities, a common head for said instrumentalities, an operating shaft having a cam thereon, and an actuating rod for the head having an anti-friction bearing in engagement with the said cam, and a guide rod for the actuating rod slidable in a bearing of the main frame, and said bearing.

95. In a labeling machine, a can feed, pasting instrumentalities, label applying instrumentalities, and label presser instrumentalities, a common head for said instrumentalities, an operating shaft having a cam thereon, an actuating rod for the head having an anti-friction bearing in engagement with the said cam, and an offset guide rod carried by the actuating rod having a slidable bearing in a stationary part of the machine.

96. In a labeling machine, a can feed, pasting instrumentalities, label applying instrumentalities, and label pressing instrumentalities, a common head for the instrumentalities, a rod for elevating the head, and a resilient return for the head.

97. In a labeling machine, a can feed, pasting instrumentalities, label applying instrumentalities, and label pressing instrumentalities, a vertically movable head common to said instrumentalities, an actuating rod rigidly connected to the head and mounted for movement in a vertical plane, means for reciprocating said rod, and means for holding the cans upright while operated on by said instrumentalities.

98. In a labeling machine, a can feed, pasting instrumentalities, label applying instrumentalities, and label pressing instrumentalities, a common head for the instrumentalities, a rod for reciprocating the head, a bearing on a stationary part of the machine for said rod, an auxiliary bearing on a stationary part of the machine, a guide rod slidable in said auxiliary bearing, and an offset bracket arm secured respectively to the operating and guide rods.

99. In a can labeling machine, a longitudinal runway adapted to support the cans, means for holding the cans in upright position on said runway, pasting instrumentalities, label applying instrumentalities, and label presser instrumentalities, a common head for said instrumentalities, means for operating the head to move the same into operative position to the cans, and means for successively feeding the cans to said instrumentalities.

100. In a labeling machine, a can feed, an endless paste feed, an endless presser member label feeding instrumentalities, a common head for all of said parts, and common means for operating said paste feed and member.

101. In a labeling machine, a can feed, an endless paste feed, an endless presser member, a common cam actuated means for operating said paste and feed members, and reciprocating plungers for said paste feed, and presser member.

102. In a labeling machine, a can feed, an endless paste feed, an endless presser member, a common cam actuated means for operating said paste and feed members, and interposed means whereby the movement of said feed and member will be intermittent.

103. In a labeling machine, a can feed, an endless paste feed, an endless presser member, a segment gear having gear connection with the paste feed and presser member, and a reciprocating rack in engagement with said segment gear.

104. In a labeling machine, a can feed, an endless paste feed, an endless presser member, a segment gear having gear connection with the paste feed and presser member, and a cam actuated reciprocating rack in engagement with said segment gear.

105. In a can labeling machine, a can feed, a paste feed movable transversely across the surface of the can to be pasted, a presser member movable transversely across the labeled can, interposed label applying instrumentalities, and means for moving said label applying instrumentalities and simultaneously forcing said paste feed and member into contact with the cans.

106. In a labeling machine, the combination of a can feed, a stationary head, a paste feed and a presser member mounted on said head, label applying instrumentalities interposed between said paste feed and presser member, and a movable head for moving said receptacle, paste feed, and member, into operative position relative to successive cans.

107. In a can head labeling machine, labeling instrumentalities, a runway for the cans comprising oppositely disposed guides having flanges to loosely engage over a flange on the can and support the same in upright position, spring arms on the guides engaging the sides of the cans, and means for feeding the cans along said runway toward and from the labeling instrumentalities.

108. In a can labeling machine, labeling instrumentalities, a runway for supporting the cans in upright position below the labeling instrumentalities, an extension at one side of the runway at the delivery end, whereby the opposite side of the can will be unsupported at said delivery end, and means for feeding the cans along said runway.

109. In a can labeling machine, labeling instrumentalities, a runway comprising oppositely disposed guides for supporting the can in upright position below said instrumentalities, one of said guides being extended beyond the other means for feeding the cans along the runway, and a delivery runway.

110. In a can labeling machine, labeling instrumentalities, a runway comprising oppositely disposed guides for supporting the cans in upright position relative to the labeling instrumentalities, a member common to and adapted to be detachably applied to either of said guides to constitute a continuation thereof at its delivery end, means for feeding the cans along the runway, and a delivery runway below said extension.

111. In a can labeling machine, labeling instrumentalities, a runway comprising oppositely disposed guides for supporting the cans in upright position to present their ends to the labeling instrumentalities, a member common to and adapted to be detachably applied to either of said guides to constitute a continuation thereof at its delivery end, means for feeding the cans along the runway, and a delivery runway mounted at the rear end of the main runway for lateral adjustment.

112. In a can labeling machine, labeling instrumentalities, a runway comprising oppositely disposed guides for supporting the cans in upright position to present their ends to the labeling instrumentalities, a member common to and adapted to be detachably applied to either of said guides to constitute a continuation thereof at its delivery end, means for feeding the cans along the runway, and a delivery runway mounted at the rear of the main runway for vertical and lateral adjustment.

113. In a can labeling machine, labeling instrumentalities, a runway comprising oppositely disposed guides for supporting the can in upright position to present their ends to the labeling instrumentalities, one of said guides being extended beyond the other, a delivery runway, and a support therefor including a T-shaped bracket mounted at the rear end of the machine constructed to position the longitudinal axis of the delivery runway to one side of the longitudinal axis of the main runway.

114. In a can labeling machine, labeling instrumentalities the combination of a runway, comprising oppositely disposed guides for supporting the can in an upright position to present their ends to the labeling instrumentalities, a member adapted to be detachably secured to either of said guides to constitute an extension thereof, a delivery runway, and a detachable and reversible support for the delivery runway.

115. In a can labeling machine, labeling instrumentalities the combination of a runway comprising oppositely disposed guides for supporting the cans in upright position to present their ends to the labeling instrumentalities, a member adapted to be applied to either of said guides to constitute an extension thereof, and a delivery runway having an adjustable support arranged to position the runway to the inside of said extension in either of its applications to said guides.

116. In a labeling machine, the combination of a guideway for cans or the like, an arm arranged above the guideway having means at one end for preventing feeding movement of one can and means at its opposite end for preventing feeding movement of an adjacent can, said last mentioned means being yieldable, and means for releasing said means.

117. In a labeling machine, the combination of a runway, means for regulating the feed of cans or the like along said runway, said means including a resilient member adapted to engage a plurality of cans, and means whereby said member may yield to release one can while it maintains holding engagement with another can.

118. In a labeling machine, the combination of a runway adapted to feed cans or the like, of an arm having means at one end to engage one can and a part at its opposite end to yieldingly hold a succeeding can, and means whereby said succeeding can is yieldingly held while the forward can is released.

119. In a labeling machine, the combination of a runway adapted to feed cans or the like, of a pivoted arm having means at one end to engage one can and a part at its opposite end to yieldingly hold a succeeding can, and means whereby said succeeding can is yieldingly held while the forward can is released.

120. In a labeling machine, the combination of a runway for cans or the like, of an arm of a length to overlap and simultaneously hold a plurality of cans, means for elevating one end of the arm to release one can, while the other end of the arm is retained in holding contact with the other can, and means for subsequently lowering the elevated end of the arm and raising the other end to release a succeeding can.

121. In a labeling machine, the combination of a runway adapted to feed cans or the like, and an elongated substantially flat spring arm arranged to overlap and holdingly engage a plurality of cans, and means for releasing one of said cans while the other is held from movement.

122. In a labeling machine, the combination of a runway for cans, a spring arm pivoted intermediate its ends to said support and above the cans, said arm being constructed and arranged to engage adjacent its opposite ends two succeeding cans, and means for engaging one end of the arm to release the same from one can while the next adjacent can is being held by the opposite end of the arm.

123. In a labeling machine, the combination of a runway for feeding cans, of an upright support on said runway, an arm pivoted intermediate its ends to the support and having a resilient part at one end to engage one can and a compressible member at its opposite end to engage the succeeding can, and releasing means for the arm.

124. In a can labeling machine, the combination of a runway for feeding cans, of an upright support on said runway, an arm pivoted intermediate its ends to the support and having a resilient part at one end to engage one can and a compressible member at its opposite end to engage the succeeding can and releasing means for the arm, means for releasing said resilient part to release the forward can without disturbing the holding action of the compressible member on the next succeeding can.

125. In a labeling machine, the combination of labeling instrumentalities, an inclined runway permitting the cans to have rolling movement along the same, a support arranged below the labeling instrumentalities for the cans delivered from the runway, and a feed for imparting movement to the cans along such support into operative position relative to the labeling instrumentalities, and means interposed between the runway and support for moving the cans from a rolling position in the runway to an upright position on said support.

126. In a labeling machine, feeding mechanism for the cans, an endwise movable paste feed adapted to deliver paste to the cans, and a laterally movable presser member for engaging the feed whereby one portion of said feed is brought into contact with the cans while the remaining portion is spaced therefrom.

127. In a labeling machine, a runway for cans, an endless belt paste feed adapted to travel over the path of the cans, and a laterally movable presser member for engaging the feed to move one portion of said feed into contact with the cans at a time, and means for operating said presser member.

128. In a labeling machine, a can support and a label applier above the support comprising a carrier frame, a removable label receptacle mounted on the frame, and a slidable interlocking connection between the receptacle and frame.

129. In a labeling machine, a frame carrier mounted for reciprocatory movement a label receptacle slidably connected to the frame whereby as the frame is lowered the receptacle will contact the can and be slightly elevated relative to the frame, and whereby as the frame is elevated the receptacle will have a lost motion, the frame subsequently raising the receptacle and lifting the lowermost label on the can, and a presser foot mounted for intermittent movement.

130. A labeling machine comprising a can support and a label feed, the latter comprising an annular frame having longitudinal guides and a label receptacle having portions slidably mounted in said guides for independent movement.

131. A labeling machine comprising a can support and a label feed, the latter comprising a frame, a label receptacle within the frame, slotted guideways on one of the parts comprising the receptacle and frame and lugs on the other part arranged to engage said guideways, as and for the purpose described.

132. In a labeling machine, a can feed, a label receptacle, a follower, a movable abutment arranged in the path of the feed, an actuating rod for the follower arranged to engage said abutment, and means whereby the abutment will be moved into the path of the rod by a fed can.

133. In a labeling machine, a can feed, a label receptacle, a follower, a movable abutment arranged in the path of the feed, an actuating rod for the follower arranged to engage said abutment the abutment being normally out of the path of the rod, and means whereby it may move into the path of the same.

134. In a labeling machine, a can feed, a label receptacle, a follower, a movable abutment arranged in the path of the feed, an actuating rod for the follower arranged to engage said abutment, spring means for normally holding the abutment in the path of the can and out of the path of the rod, and means whereby the can will force the abutment against the action of the spring into contact with the rod.

135. In a labeling machine, a guideway for cans, means for feeding the cans along said guideway, a label receptacle, a follower in the receptacle, an actuating rod for the follower and an abutment pivoted to the guideway to swing into and out of the path of the rod.

136. In a labeling machine, a guideway for cans, means for feeding the cans along said guideway, a label receptacle, a follower in the receptacle, an actuating rod for the follower and a spring pressed abutment pivoted to the guideway to swing into and out of the path of the rod.

137. In a labeling machine, the combination of a can feed, a label receptacle, a follower for the labels in the receptacle, an actuating rod for the follower and a yieldable connection between said actuating rod and the follower.

138. In a labeling machine, the combination of a can feed, a label receptacle, a follower for feeding the labels in the receptacle, and actuating mechanism for the follower including slidably connected rods.

139. In a labeling machine, the combination of a can feed, a label receptacle, a follower for feeding the labels in the receptacle actuating mechanism for the follower including slidably connected rods with a yieldable connection therebetween.

140. In a labeling machine, the combination of a can feed, a label receptacle, a follower for feeding the labels in the receptacle, actuating mechanism for the follower, a reciprocating rod having a pawl and ratchet engagement with said follower, and means for actuating said rod by the passing can.

141. In a labeling machine, the combination of a can feed, a label receptacle, a follower for feeding the labels in the receptacle actuating mechanism for the follower, a reciprocating rod having a pawl and ratchet engagement with said follower, and means for actuating said rod by the passing can, said means including an abutment pivoted to swing into and out of operative relation with said rod.

142. In a labeling machine, the combination of a can feed, a label receptacle, a follower in the receptacle, a movable abutment, and a yieldable rod operatively associated with said abutment and follower for moving the latter by the passage of a can.

143. In a labeling machine, the combination of a can feed, a label receptacle, a follower in the receptacle, a movable abutment and an adjustable rod operatively associated with said abutment and follower for moving the latter by the passage of a can.

144. In a labeling machine, the combination of a can feed, a label receptacle, a follower in the receptacle, a movable abutment, a lengthwise adjustable rod operatively associated with said abutment and follower for moving the latter by the passage of a can, and means whereby said rod may automatically yield.

145. In a labeling machine, the combination of a can feed, means for applying labels to the cans, a presser member operating on the applied labels, means for moving the presser member into and out of contact with the applied label, the presser member being constructed and arranged to present a different operating surface to successive cans, and means for holding the cans stationary while acted on by the presser member.

146. In a labeling machine, feeding mechanism for the cans, label applying instrumentalities, presser mechanism including an elongated member adapted to play across the label on the can, and means for operating the member intermittently to move a different portion thereof in position relative to the can pressure exerting means for the member.

147. In a can labeling machine, a can feed, pasting instrumentalities including an endless belt, pressing instrumentalities including an endless belt, and interposed label applying instrumentalities, and means for simultaneously moving said instrumentalities to and from the fed cans.

148. In a can labeling machine, a can feed, pasting instrumentalities including an endless belt, pressing instrumentalities including an endless belt, and interposed label applying instrumentalities, a common head for the instrumentalities, and means for reciprocating the head.

149. In a can labeling machine, a can feed, pasting instrumentalities including an endless belt, pressing instrumentalities including an endless belt, and interposed label applying instrumentalities, a common head for the instrumentalities, means for reciprocating the head, and means for rotating the belts when reciprocated out of the path of the cans.

150. In a can labeling machine, a can feed, a flexible paste applying member, and a reciprocating plunger movable into and out of contact with the member for forcing the same into operative position.

151. In a can labeling machine, a can support, an endless yieldable paste feed member, and means interposed between opposite stretches of the feed member for engaging said member for forcing the same into contact with the can to paste the latter.

152. In a can labeling machine, a can support, and pasting instrumentalities including a longitudinally movable member and means movable transversely relative to said movable member adapted to engage the movable member and to move the same transversely into operative position, and means independent of the can for operating said means.

153. In a can labeling machine, a can support, and pasting instrumentalities including a flexible longitudinally movable member, and means engaging the same to force a portion of the same transversely to the body thereof into operative position, and operating mechanism for the latter.

154. In a can labeling machine, a can support, an endless paste feed member, and means engaging one stretch of said member intermediate its ends to force a portion of said stretch transversely.

155. In a can labeling machine, a can support, a flexible endless paste feed member, and means engaging one stretch of said member intermediate its ends to cause a portion of said stretch to flex and move transversely.

156. In a can labeling machine, can feeding instrumentalities and pasting instrumentalities including an endless rubber belt, means for imparting rotary movement to the belt, a plunger engaging the belt between opposite portions thereof to force the same in a different direction, and an operating mechanism for said plunger.

157. In a can labeling machine, a can support, an endless paste feed member, and a presser foot interposed between opposite stretches of the member, said presser foot having a yieldable surface to engage one stretch of the belt.

158. In a can labeling machine, a can support, a lengthwise movable flexible paste feed member, a yieldably supported presser foot to engage said member to move the same laterally, and positive driving means for said member.

159. In a can labeling machine, a can support, and means for applying paste to the cans including an endless belt movable over the path of the can, and means for positively forcing a portion only of said belt into contact with the cans.

In testimony whereof we affix our signatures in presence of two witnesses.

FRED H. KNAPP.
CLARENCE W. BLACKSTONE.

Witnesses:
   Geo. H. Armacost,
   D. L. Farrar.